United States Patent
Takahashi

(10) Patent No.: US 10,044,298 B2
(45) Date of Patent: Aug. 7, 2018

(54) ROTATING ELECTRIC MACHINE DRIVE SYSTEM

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/341,529

(22) Filed: Nov. 2, 2016

(65) Prior Publication Data

US 2017/0133960 A1    May 11, 2017

(30) Foreign Application Priority Data

Nov. 6, 2015   (JP) ................................. 2015-218937

(51) Int. Cl.
| | |
|---|---|
| *H03K 5/00* | (2006.01) |
| *H02P 6/10* | (2006.01) |
| *H02P 25/022* | (2016.01) |
| *H02P 25/08* | (2016.01) |

(52) U.S. Cl.
CPC .............. *H02P 6/10* (2013.01); *H02P 25/022* (2013.01); *H02P 25/08* (2013.01); *H02P 2209/13* (2013.01)

(58) Field of Classification Search
CPC ........................... H02P 25/184; H02P 2209/13
See application file for complete search history.

(56) References Cited

U.S. PATENT DOCUMENTS

| | | | |
|---|---|---|---|
| 7,034,426 B2 | 4/2006 | Goche | |
| 8,796,899 B2 | 8/2014 | Imazawa et al. | |
| 2002/0074969 A1 | 6/2002 | Edelson | |
| 2004/0195994 A1 | 10/2004 | Kume et al. | |

(Continued)

FOREIGN PATENT DOCUMENTS

| | | |
|---|---|---|
| JP | S64-34198 A | 2/1989 |
| JP | 2014-054094 A | 3/2014 |

OTHER PUBLICATIONS

U.S. Appl. No. 15/341,363, filed Nov. 2, 2016 in the name of Yuki Takahashi.

(Continued)

*Primary Examiner* — Karen Masih
(74) *Attorney, Agent, or Firm* — Olff PLC

(57) ABSTRACT

A rotating electric machine drive system includes a rotating electric machine and a drive apparatus. The rotating electric machine includes a Y-connected three-phase stator coil. The drive apparatus supplies electric current to the stator coil and thereby drives the rotating electric machine. In a predetermined high-torque region, the drive apparatus supplies the stator coil with the electric current which has a waveform obtained by superimposing a specific harmonic waveform on a first-order harmonic waveform. The specific harmonic waveform is one of third-order and (3+6n)th-order harmonic waveforms, or a harmonic waveform which is obtained by synthesizing at least two of the third-order and (3+6n)th-order harmonic waveforms, where n is a natural number not less than 1. The specific harmonic waveform takes a negative integral value for a positive half cycle of the first-order harmonic waveform and a positive integral value for a negative half cycle of the first-order harmonic waveform.

13 Claims, 21 Drawing Sheets

(56) References Cited

U.S. PATENT DOCUMENTS

| | | |
|---|---|---|
| 2004/0227482 A1 | 11/2004 | Yoshida et al. |
| 2005/0253540 A1 | 11/2005 | Kobayashi et al. |
| 2008/0036416 A1 | 2/2008 | Lo |
| 2009/0072652 A1 | 3/2009 | Koike |
| 2009/0237021 A1 | 9/2009 | Yamamoto et al. |
| 2009/0267440 A1 | 10/2009 | Kometani et al. |
| 2009/0302792 A1* | 12/2009 | Osada .................. H02P 29/032 318/400.21 |
| 2010/0054972 A1 | 3/2010 | Li et al. |
| 2013/0342041 A1 | 12/2013 | Ayers et al. |
| 2014/0125185 A1 | 5/2014 | Suzuki et al. |
| 2014/0239876 A1 | 8/2014 | Hao et al. |
| 2016/0072416 A1 | 3/2016 | Hirotani et al. |

OTHER PUBLICATIONS

U.S. Appl. No. 15/341,381, filed Nov. 2, 2016 in the name of Yuki Takahashi.
Nov. 3, 2007 Office Action issued in U.S. Appl. No. 15/341,381.
Nov. 30, 2017 Office Action issued in U.S. Appl. No. 15/341,363.
Jun. 18, 2018 Office Action issued in U.S. Appl. No. 15/341,381.
Jun. 19, 2018 Office Action issued in U.S. Appl. No. 15/341,363.

* cited by examiner

- - - 1ST-ORDER HARMONIC
——— 3RD-ORDER HARMONIC
—•— 1ST-ORDER+3RD-ORDER HARMONICS

ELECTRICAL ANGLE [deg]

- - MAGNET TORQUE —  · RELUCTANCE TORQUE ——— TOTAL TORQUE

CONTROL ADVANCE ANGLE [deg]

ELECTRICAL ANGLE [deg]

ADVANCING ANGLE OF STATOR TOOTH [deg]

ELECTRICAL ANGLE [deg]

ELECTRICAL ANGLE [deg]

ROTATING ELECTRIC MACHINE DRIVE SYSTEM

CROSS-REFERENCE TO RELATED APPLICATION

This application is based on and claims priority from Japanese Patent Application No. 2015-218937 filed on Nov. 6, 2015, the content of which is hereby incorporated by reference in its entirety into this application.

BACKGROUND

1. Technical Field

The present invention relates to rotating electric machine drive systems that are used in, for example, motor vehicles to drive electric motors and electric generators.

2. Description of Related Art

Conventionally, it has been desired for electric motors for electric vehicles to exert high-torque and high-efficiency characteristics over a wide operating range from low speed to high speed.

To satisfy such a desire, there has been developed a method of switching the connection of a stator coil of an electric motor between a Y connection (or star connection) and a Δ connection (or delta connection) so as to enable the electric motor to exert optimal characteristics in both a low-speed region and a high-speed region (see, for example, Japanese Patent Application Publication No. JP2014054094A).

It is required for four-wheel drive vehicles and heavy medium-sized or large-sized vehicles to have an excellent hill-climbing ability. Moreover, in an engine-starting operation, diesel engine vehicles generally require twice or more torque than gasoline engine vehicles.

The above-requirements may be met by increasing the amount of electric current supplied to rotating electric machines used in the vehicles or increasing the sizes of the rotating electric machines.

However, increasing the amount of electric current supplied to the rotating electric machines would result in increases in the copper and iron losses of the rotating electric machines. On the other hand, increasing the sizes of the rotating electric machines would make it difficult for the rotating electric machines to be received in a limited space in an engine compartment.

SUMMARY

The inventor of the present application has focused on the third-order and (3+6n)th-order harmonics which are generally not utilized (or included) in the electric current supplied to a stator coil of a rotating electric machine since these harmonics may result in an increase in the iron loss of the rotating electric machine. The inventor has first found, through research and investigation, that it is possible to achieve a high efficiency of a rotating electric machine in a predetermined high-torque region by supplying a predetermined harmonic electric current to a stator coil of the rotating electric machine in the predetermined high-torque region. The present invention has been made based on the above findings by the inventor.

According to the present invention, there is provided a first rotating electric machine drive system which includes a rotating electric machine and a drive apparatus. The rotating electric machine includes a Y-connected three-phase stator coil and a rotor that produces both magnet torque and reluctance torque. The drive apparatus supplies electric current to the stator coil and thereby drives the rotating electric machine. In a predetermined high-torque region, the drive apparatus supplies the stator coil with the electric current which has a waveform obtained by superimposing a specific harmonic waveform on a first-order harmonic waveform. The specific harmonic waveform is one of third-order and (3+6n)th-order harmonic waveforms, or a harmonic waveform which is obtained by synthesizing at least two of the third-order and (3+6n)th-order harmonic waveforms, where n is a natural number greater than or equal to 1. The specific harmonic waveform takes a negative integral value for a positive half cycle of the first-order harmonic waveform and a positive integral value for a negative half cycle of the first-order harmonic waveform.

In the rotating electric machine having the rotor producing both the magnet torque and the reluctance torque, the magnet torque is proportional to $\Psi \times Iq$ and the reluctance torque is proportional to $(Lq-Ld) \times Id \times Iq$, where $\Psi$ is magnet magnetic flux, Iq is q-axis electric current, Id is d-axis electric current, Lq is q-axis inductance and Ld is d-axis inductance.

In general, in using the reluctance torque, the magnetic force of magnets is weakened, causing a loss. Therefore, in a low-torque region where the electric current is low, it is efficient to use $\Psi \times Iq$ rather than $(Lq-Ld) \times Id \times Iq$. Moreover, in the case where the magnets are implemented by strong magnets (e.g., sintered neodymium magnets), the total torque is higher when the magnet torque is used than when the reluctance torque is used. Accordingly, in the low-torque region, it is preferable to increase the magnet magnetic flux $\Psi$ and the q-axis electric current Iq.

On the other hand, when the electric current is high, the reluctance torque is higher than the magnet torque even in a state where the magnet magnetic flux $\Psi$ is high. This is because the reluctance torque is a quadratic function of the electric current (i.e., proportional to $Id \times Iq$), whereas the magnet torque is a linear function of the electric current (i.e., proportional to Iq). Accordingly, in this case, it is preferable to increase the reluctance torque by increasing $(Lq-Ld)$. Further, to increase $(Lq-Ld)$, it is preferable to increase the q-axis inductance Lq while reducing the magnet magnetic flux $\Psi$ and the d-axis inductance Ld by increasing the d-axis magnetic reluctance.

In the first rotating electric machine drive system according to the present invention, in the predetermined high-torque region, the drive apparatus supplies the stator coil with the electric current which has the waveform obtained by superimposing the specific harmonic waveform on the first-order harmonic waveform. Consequently, it is possible to increase the q-axis inductance Lq; it is also possible to increase the d-axis magnetic reluctance, thereby reducing the magnet magnetic flux $\Psi$ and the d-axis inductance Ld. As a result, it is possible to increase the total torque produced by the rotor, thereby achieving a high efficiency of the rotating electric machine in the predetermined high-torque region.

According to the present invention, there is also provided a second rotating electric machine drive system which includes a rotating electric machine and a drive apparatus. The rotating electric machine includes a stator and a rotor. The stator includes a stator core and a three-phase stator coil mounted on the stator core. The stator coil is configured to be switchable between a Y connection and a Δ connection. The rotor is configured to produce both magnet torque and reluctance torque. The drive apparatus supplies electric current to the stator coil and thereby drives the rotating electric machine. In a predetermined high-torque region where the magnet torque produced by the rotor is lower than the reluctance torque produced by the rotor, the drive apparatus supplies the electric current to the stator coil with the stator coil switched to the Δ connection.

With the above configuration, in the predetermined high-torque region, it is possible for the drive apparatus to supply the Δ-connected stator coil with the electric current which has a waveform obtained by superimposing a specific harmonic waveform on a first-order harmonic waveform. The specific harmonic waveform is one of the third-order and (3+6n)th-order harmonic waveforms or a harmonic waveform which is obtained by synthesizing at least two of the third-order and (3+6n)th-order harmonic waveforms, where n is a natural number greater than or equal to 1. The specific harmonic waveform takes a negative integral value for a positive half cycle of the first-order harmonic waveform and a positive integral value for a negative half cycle of the first-order harmonic waveform. Consequently, it is possible to increase the q-axis inductance Lq; it is also possible to increase the d-axis magnetic reluctance, thereby reducing the magnet magnetic flux Ψ and the d-axis inductance Ld. As a result, it is possible to increase the total torque produced by the rotor, thereby achieving a high efficiency of the rotating electric machine in the predetermined high-torque region.

In addition, the lower the frequency of the specific harmonic waveform used in the above first and second rotating electric machine drive systems, the higher the amplitude of the specific harmonic waveform. Therefore, to more reliably achieve the above-described advantageous effects, it is preferable to set the frequency of the specific harmonic waveform as low as possible.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
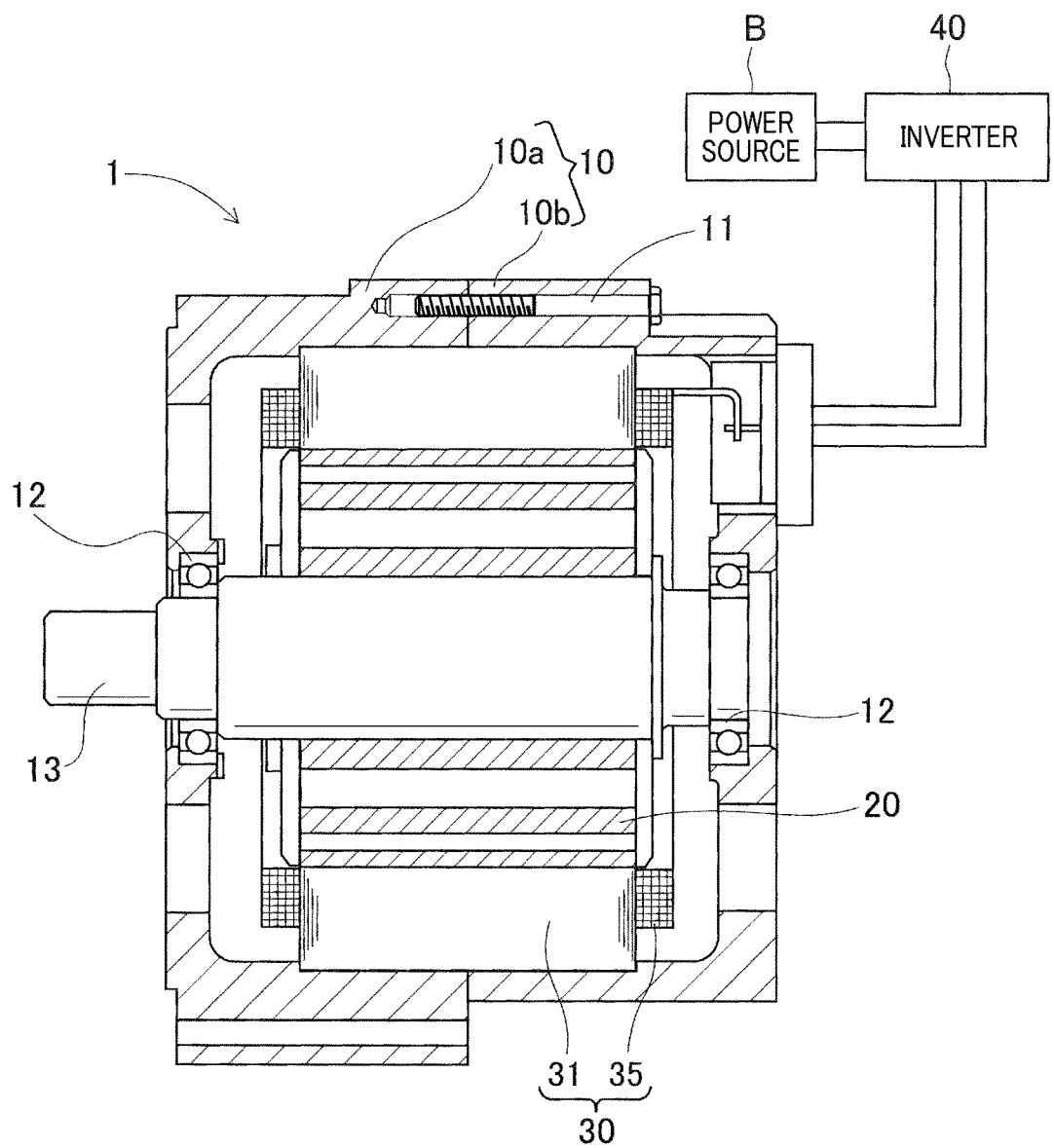
FIG. 1 is a schematic configuration diagram of a rotating electric machine drive system according to a first embodiment.

Exemplary embodiments will be described hereinafter with reference to FIGS. 1-32. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

[First Embodiment]

FIG. 1 shows the overall configuration of a rotating electric machine drive system according to the first embodiment. The rotating electric machine drive system includes a rotating electric machine 1, an inverter 40 that functions as a drive apparatus to drive the rotating electric machine 1, and an electric power source B.

In the present embodiment, the rotating electric machine 1 is configured as an electric motor for use in a motor vehicle.

As shown in FIG. 1, the rotating electric machine 1 includes a housing 10, a rotating shaft 13, a rotor 20 and a stator 30.

The housing 10 has a hollow cylindrical shape with both axial ends closed. The housing 10 is comprised of a pair of cup-shaped housing pieces 10a and 10b which are fixed together at the open ends thereof by, for example, a plurality of bolts 11.

The rotating shaft 13 is rotatably supported by the housing 10 via a pair of bearings 12 that are provided respectively in opposite axial end walls of the housing 10.

The rotor 20 is received in the housing 10 and fixedly fitted on an axially central part of the rotating shaft 13 so as to rotate together with the rotating shaft 13. The rotor 20 functions as a field to produce both magnet torque and reluctance torque.

Figure 2:
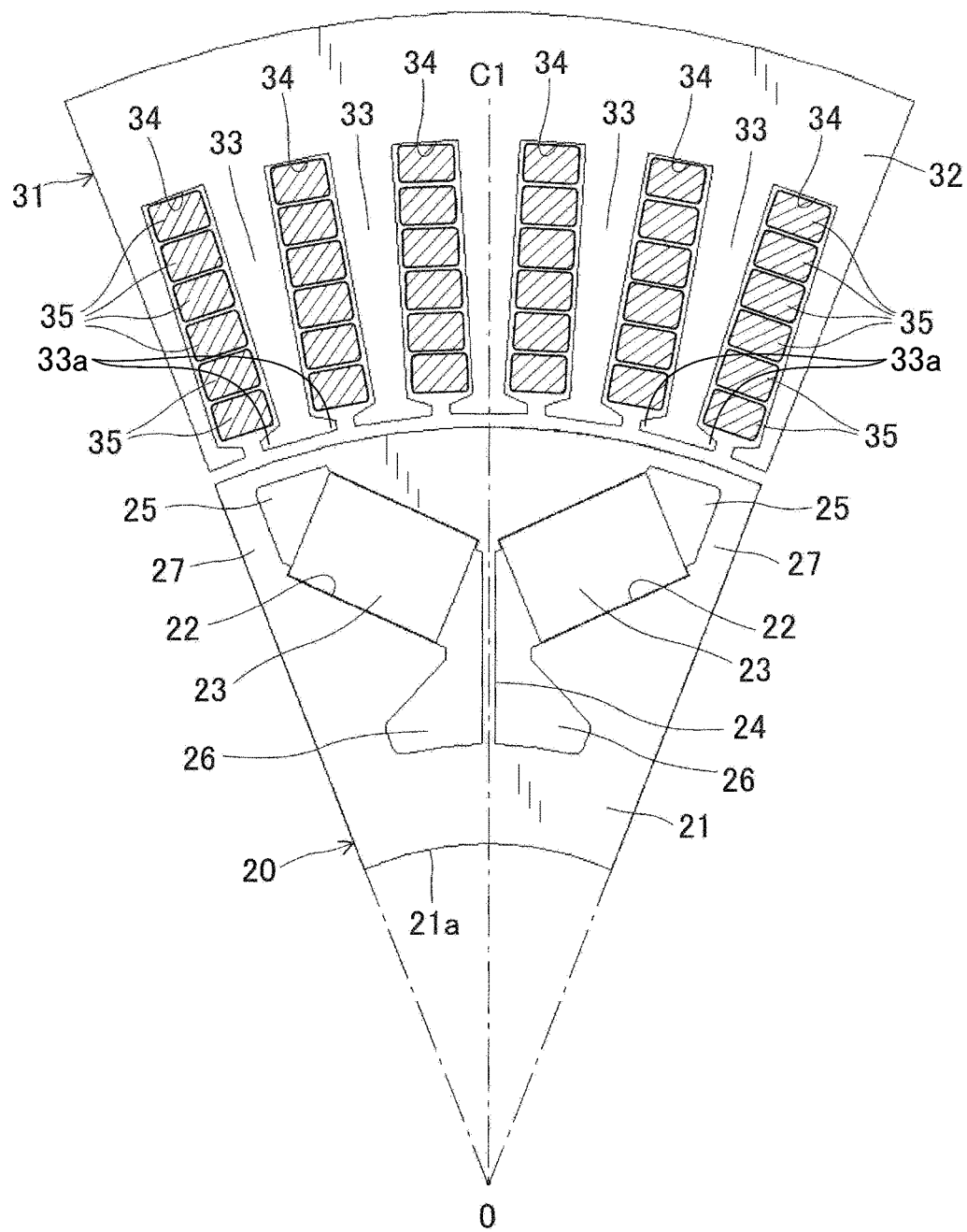
FIG. 2 is a schematic view, along an axial direction, of part of a rotating electric machine included in the rotating electric machine drive system.

As shown in FIG. 2, the rotor 20 includes a rotor core 21 and a plurality of permanent magnets 23 embedded in the rotor core 21. That is to say, in the present embodiment, the rotor 20 is configured as an Interior Permanent Magnet (IPM) rotor.

The rotor core 21 is formed, by axially laminating a plurality of annular magnetic steel sheets, into a hollow cylindrical shape. Consequently, at the radial center of the rotor core 21, there is formed a through-hole 21a, in which the rotating shaft 13 is fixedly fitted so as to rotate together with the rotor core 21.

The permanent magnets 23 are embedded in the rotor core 21 so as to form a plurality of magnetic poles of the rotor 20 on the radially outer periphery of the rotor core 21. The magnetic poles are equally spaced in the circumferential direction of the rotor core 21 at predetermined intervals so that the polarities of the magnetic poles alternate between N (North) and S (South) in the circumferential direction. In addition, in the present embodiment, the number of the magnetic poles of the rotor 20 is equal to, for example, 8 (i.e., 4 N poles and 4 S poles).

More specifically, in the present embodiment, the rotor core 21 has a plurality (e.g., eight) of pairs of magnet-receiving holes 22 formed in the vicinity of the radially outer periphery of the rotor core 21. Each of the magnet-receiving holes 22 extends in the axial direction of the rotor core 21 so as to penetrate the rotor core 21 in the axial direction. Further, each of the magnet-receiving holes 22 has a substantially rectangular cross section perpendicular to a longitudinal axis O of the rotor core 21 (or the axis of rotation of the rotor 20).

In addition, it should be noted that though there is shown only one pair of the magnet-receiving holes 22 in FIG. 2, the plurality of pairs of the magnet-receiving holes 22 are equally spaced in the circumferential direction of the rotor core 21 at predetermined intervals.

Moreover, in the present embodiment, each pair of the magnet-receiving holes 22 is arranged so as to form a substantially V-shape that opens toward the radially outer periphery of the rotor core 21. Further, for each pair of the magnet-receiving holes 22, there is formed a corresponding center bridge 24 of the rotor core 21 which extends in a radial direction of the rotor core 21 at a substantially constant width so as to separate the two magnet-receiving holes 22 of the pair from each other. The corresponding center bridge 24 is provided for causing magnetic flux saturation and thereby impeding formation of a magnetic circuit between the two magnet-receiving holes 22.

Each of the permanent magnets 23 is inserted in a corresponding one of the magnet-receiving holes 22 of the rotor core 21 so as to extend in the axial direction of the rotor core 21. Further, each of the permanent magnets 23 has a substantially rectangular cross section perpendicular to the axial direction of the rotor core 21 (i.e., the direction of the longitudinal axis O of the rotor core 21). That is to say, in the present embodiment, each of the permanent magnets 23 has a substantially cuboid shape.

Moreover, for each pair of the magnet-receiving holes 22 of the rotor core 21, the two permanent magnets 23 which are respectively inserted in the two magnet-receiving holes 22 of the pair are arranged so that the polarities (N or S) of the two permanent magnets 23 are the same on the radially outer periphery of the rotor core 21. Consequently, the two permanent magnets 23 together form one of the magnetic poles of the rotor 20 on the radially outer periphery of the rotor core 21. In addition, as shown in FIG. 2, when viewed along the axial direction of the rotor core 21, the two permanent magnets 23 are symmetrically arranged and extend obliquely with respect to a centerline C1 of the magnetic pole; the centerline C1 extends in the radial direction, along which the corresponding center bridge 24 of the rotor core 21 is formed, and bisects the magnetic pole in the circumferential direction of the rotor core 21. Consequently, the two permanent magnets 23 also together form a substantially V-shape that opens radially outward (i.e., toward the radially outer periphery of the rotor core 21).

The rotor 21 also has a plurality of q-axis core portions 27 through which q-axis magnetic flux flows. Each of the q-axis core portions 27 is formed between a corresponding circumferentially-adjacent pair of the magnetic poles of the rotor 20. Further, for each of the magnet-receiving holes 22 of the rotor core 21, there is provided a first magnetic flux barrier (or magnetic void) 25 between the corresponding permanent magnet 23 received in the magnet-receiving hole 22 and the corresponding q-axis core portion 27 adjacent to the magnet-receiving hole 22. In other words, the first magnetic flux barrier 25 is provided on the corresponding q-axis core portion 27 side of the magnet-receiving hole 22.

Moreover, for each pair of the magnet-receiving holes 22 of the rotor core 21, there are provided a pair of second magnetic flux barriers 26 that respectively extend from centerline C1-side ends of the pair of the magnet-receiving holes 22 toward the longitudinal axis O of the rotor core 21. Further, the corresponding center bridge 24, which is formed between the pair of the magnet-receiving holes 22, is radially extended toward the longitudinal axis O of the rotor core 21 so as to also separate the pair of the second magnetic flux barriers 26 from each other.

In addition, in the present embodiment, each of the first and second magnetic flux barriers 25 and 26 is provided in the form of an air gap in the rotor core 21.

Referring to FIGS. 1 and 2, the stator 30 includes a hollow cylindrical (or annular) stator core 31 and a three-phase stator coil 35 mounted on the stator core 31.

The stator core 31 is disposed radially outside the rotor 20 so that the radially inner surface of the stator core 31 faces the radially outer surface of the rotor core 21 through a predetermined air gap formed therebetween. The stator core 31 is fixed to the inner circumferential surface of the housing 10. More specifically, the stator core 31 is axially fixedly sandwiched between the pair of housing pieces 10a and 10b (see FIG. 1).

In the present embodiment, the stator core 31 is formed by axially laminating a plurality of magnetic steel sheets into the hollow cylindrical shape.

The stator core 31 includes an annular back core portion 32, a plurality of teeth 33 and a plurality of slots 34. The teeth 33 each extend radially inward from the back core portion 32 and are spaced from one another at a predetermined pitch in the circumferential direction of the stator core 31 (or the circumferential direction of the back core portion 32). Each of the slots 34 is formed between one circumferentially-facing pair of side surfaces of the teeth 33 so as to radially extend to open on the radially inner surface of the stator core 31. In addition, each of the teeth 33 has a pair of protrusions 33a formed at a distal end (or radially inner end) thereof so as to protrude respectively toward opposite circumferential sides.

In the present embodiment, the number of the slots 34 formed per magnetic pole of the rotor 20 that has the eight magnetic poles and per phase of the three-phase stator coil 35, namely, the slot multiplier number is equal to 2. Accordingly, the total number Sn of the slots 34 formed in the stator core 31 can be determined by the following equation: Sn=S×Mn×P=2×8×3=48, where S is the slot multiplier number, Mn is the number of the magnetic poles of the rotor 20 and P is the number of phases of the stator coil 35.

The stator coil 35 is mounted on the stator core 31 so as to be received in the slots 34 of the stator core 31.

Figure 3:
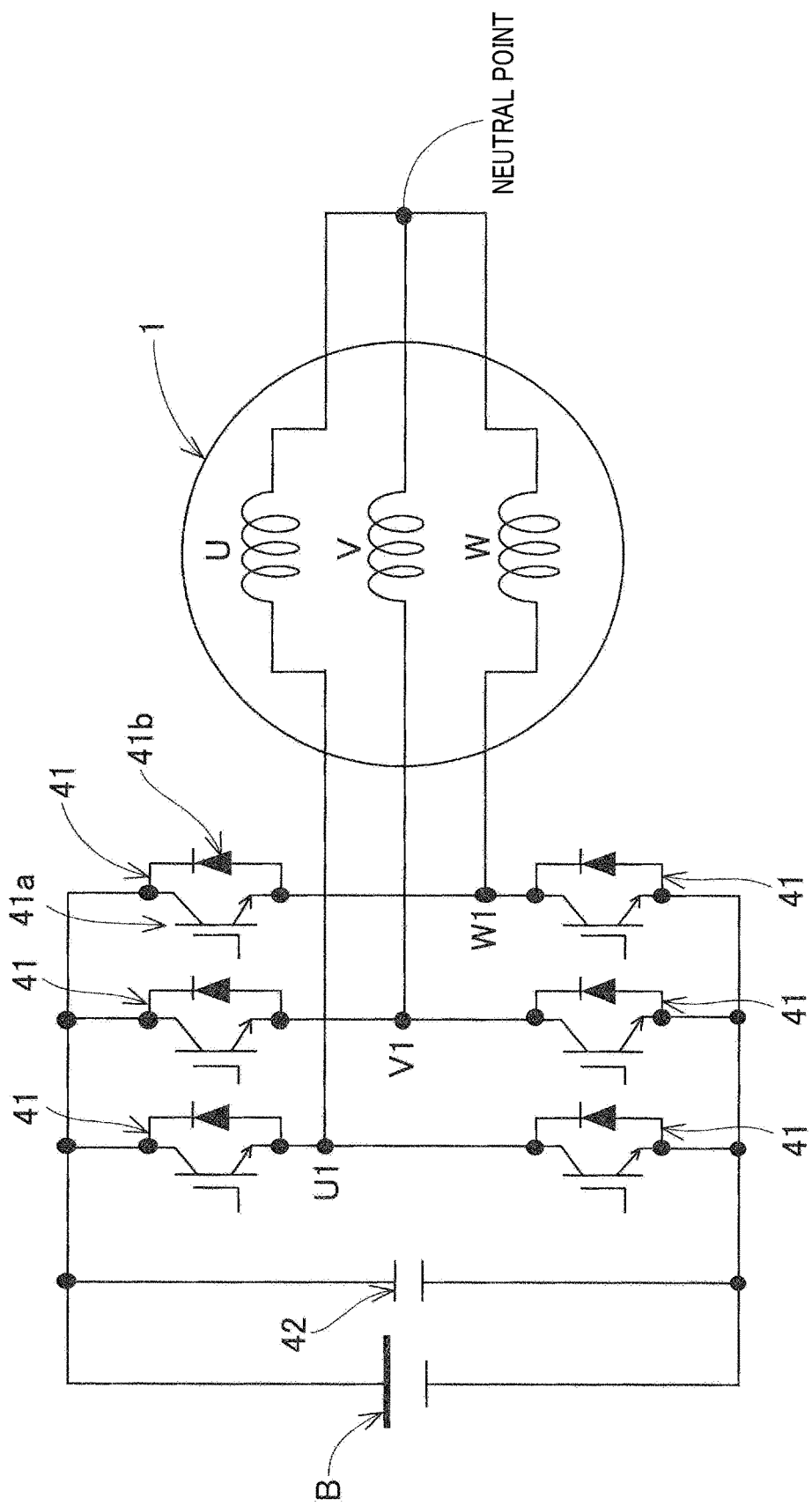
FIG. 3 is a schematic circuit diagram of the rotating electric machine drive system.

As shown in FIG. 3, in the present embodiment, the stator coil 35 includes a U-phase winding, a V-phase winding and a W-phase winding that are Y-connected to define a neutral point therebetween. More specifically, each of the U-phase, V-phase and W-phase windings has first and second ends. The first ends of the U-phase, V-phase and W-phase windings are connected with each other at the neutral point. The second ends of the U-phase, V-phase and W-phase windings are connected respectively with output terminals U1, V1 and W1 of the inverter 40.

The inverter 40 includes three upper arm units 41 and three lower arm units 41. Each of the upper and lower arm units 41 includes an IGBT (Insulated Gate Bipolar Transistor) 41a and a flyback diode (or freewheeling diode) 41b that are connected in parallel with each other. The inverter 40 also includes a smoothing capacitor 42 that smoothes alternating current on the electric power source B side.

The inverter 40 has the same functions as a well-known PWM control inverter. Based on a PWM (Pulse Width Modulation) signal which is a control output signal for a V/F control or a vector control, the IGBTs 41a of the upper and lower arm units 41 are repeatedly turned on and off, thereby generating three-phase AC voltage. More specifically, the IGBTs 41a of the upper arm units 41 are operated in inverse relation to the IGBTs 41a of the lower arm units 41; thus the IGBTs 41a of the upper arm units 41 are not turned on at the same time as the IGBTs 41a of the lower arm units 41. In addition, the on/off operations of the IGBTs 41a of the upper and lower arm units 41 are controlled by a not-shown ECU (Electronic Control Unit) based on a signal outputted from a not-shown position sensor that senses the rotational position of the rotor 20 of the rotating electric machine 1.

Figure 4:
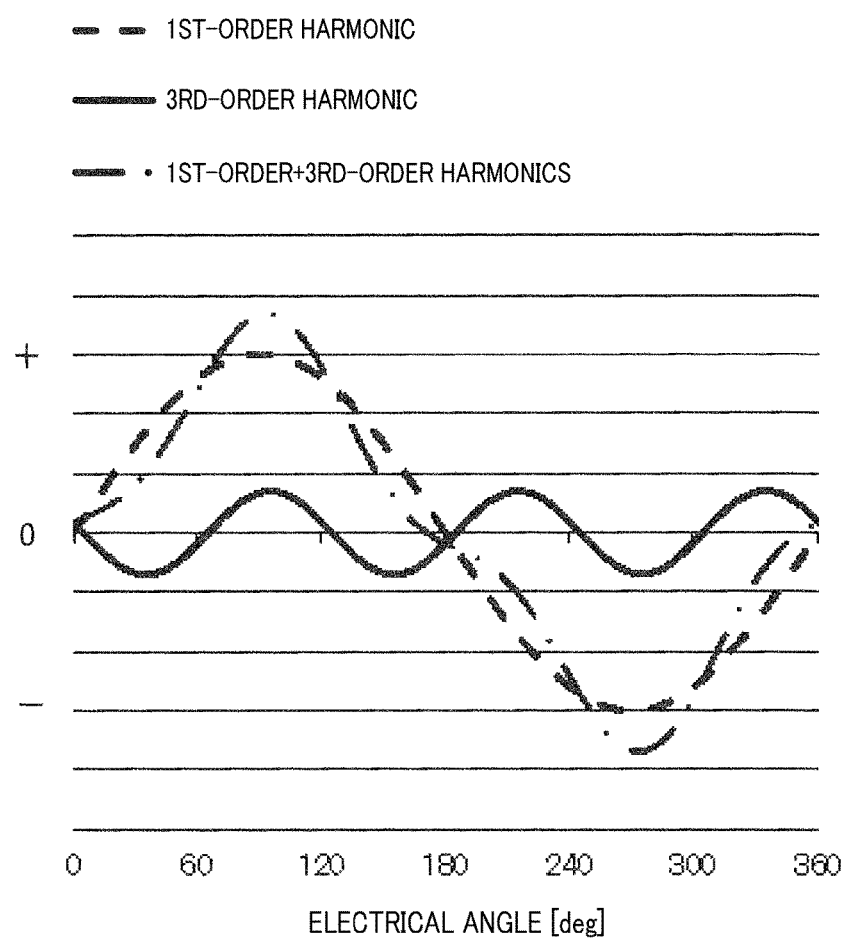
FIG. 4 is a waveform chart illustrating electric current supplied to a stator coil of a stator of the rotating electric machine in the rotating electric machine drive system.

In the present embodiment, in a predetermined high-torque region, the inverter 40 supplies the stator coil 35 with electric current (or control current) having a waveform as shown with a one-dot chain line in FIG. 4. The waveform is obtained by superimposing a specific harmonic waveform as shown with a continuous line in FIG. 4 on a first-order harmonic waveform as shown with a dashed line in FIG. 4. The first-order harmonic waveform is a fundamental control waveform. The specific harmonic waveform is one of third-order and (3+6n)th-order harmonic waveforms, or a harmonic waveform which is obtained by synthesizing at least two of the third-order and (3+6n)th-order harmonic waveforms, where n is a natural number greater than or equal to 1. The specific harmonic waveform takes a negative integral value for a positive half cycle of the first-order harmonic waveform (e.g., the half cycle from 0° to 180° in FIG. 4) and a positive integral value for a negative half cycle of the first-order harmonic waveform (e.g., the half cycle from 180° to 360° in FIG. 4). In other words, the integral value of the specific harmonic waveform for a positive half cycle of the first-order harmonic waveform is negative; the integral value of the specific harmonic waveform for a negative half cycle of the first-order harmonic waveform is positive. More particularly, in the present embodiment, the specific harmonic waveform is the third-order harmonic waveform as shown in FIG. 4. Consequently, by supplying the above electric current to the stator coil 35, it is possible to increase the q-axis inductance Lq, thereby increasing the reluctance torque and thus the total torque produced by the rotor 20. In addition, the third-order and (3+6n)th-order harmonics may be together referred to as harmonics of the third-order group.

Next, the principle of increasing the reluctance torque using the harmonics of the third-order group according to the present embodiment will be described.

Figure 5:
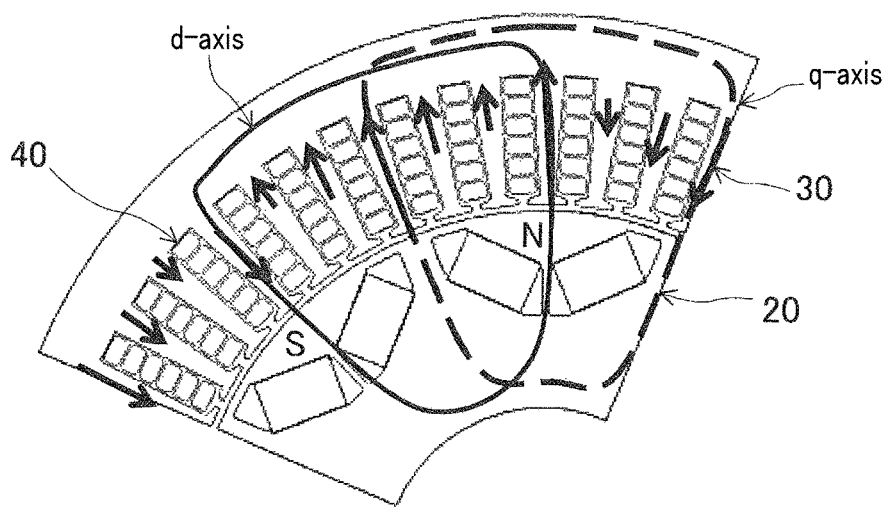
FIG. 5 is a schematic view illustrating both the flow of magnetic flux along a d-axis magnetic flux path and the flow of magnetic flux along a q-axis magnetic flux path in the rotating electric machine.

In FIG. 5, a d-axis magnetic flux path is shown with a continuous line, and a q-axis magnetic flux path is shown with a dashed line. Along the d-axis magnetic flux path, d-axis magnetic flux flows between the rotor 20 and the stator 30. Along the q-axis magnetic flux path, q-axis magnetic flux flows between the rotor 20 and the stator 30. Moreover, in FIG. 5, the continuous-line arrows indicate stator magnetic flux which is generated in the stator 30 when electric current having the first-order harmonic waveform is supplied to the stator coil 35. The longer the continuous-line arrows, the higher the strength of the stator magnetic flux.

Figure 6:
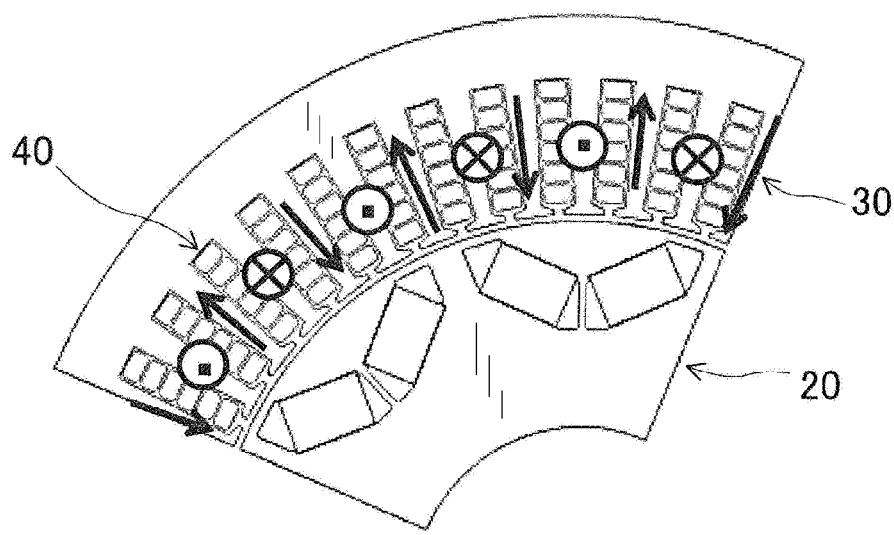
FIG. 6 is a schematic view illustrating magnetic flux in the stator when the electric current having a specific harmonic waveform is supplied to the stator coil.

On the other hand, in FIG. 6, the continuous-line arrows indicate stator magnetic flux which is generated in the stator 30 when electric current having the specific harmonic waveform is supplied to the stator coil 35. In the present embodiment, each phase winding of the stator coil 35 is arranged in a plurality of pairs of circumferentially adjacent slots 34 of the stator core 31. As seen from FIG. 6, for each of the pairs of circumferentially adjacent slots 34, the stator magnetic flux flows in opposite radial directions respectively on opposite circumferential sides of the pair of circumferentially adjacent slots 34.

Moreover, as seen from FIGS. 5 and 6, along the q-axis magnetic flux path, the stator magnetic flux generated by the electric current having the first-order harmonic waveform and the stator magnetic flux generated by the electric current having the specific harmonic waveform flow in the same radial direction and thus are strengthened by each other (or added to each other). Consequently, the magnetic reluctance along the d-axis magnetic flux path is increased, making it difficult for magnetic flux to flow along the d-axis magnetic flux path. As a result, by supplying the stator coil 35 with the electric current having the waveform obtained by superimposing the specific harmonic waveform on the first-order harmonic waveform, it becomes possible to increase the reluctance torque.

In the present embodiment, the high-torque region is predetermined as an operating region of the rotating electric machine 1 where the magnet torque produced by the rotor 20 is lower than the reluctance torque produced by the rotor 20.

Hereinafter, the high-torque region will be described in more detail by taking an IPM motor, where the ratio between the maximum values (or amplitudes) of the magnet torque and reluctance torque is 1:1, as an example.

Figure 7:
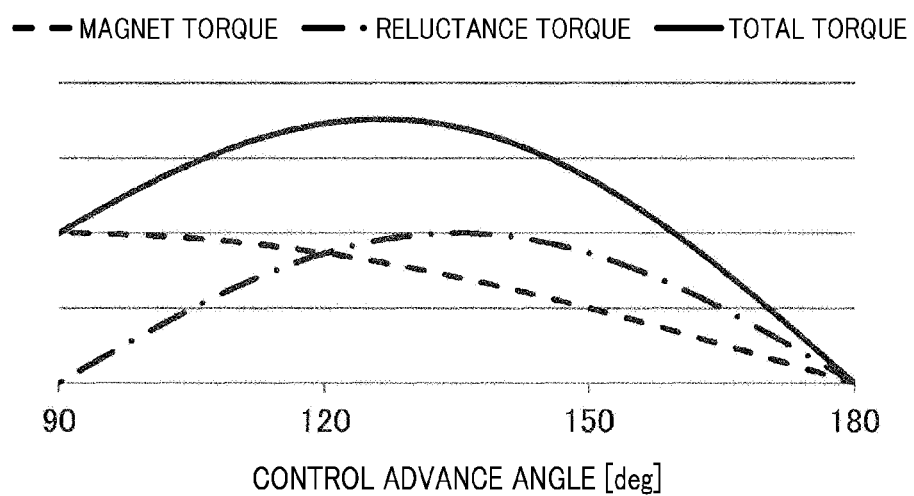
FIG. 7 is a graphical representation illustrating the magnet torque, reluctance torque and total torque of an Interior Permanent Magnet (IPM) motor in a power running control region.

FIG. 7 illustrates the magnet torque, reluctance torque and total torque of the IPM motor in a power running control region. On the other hand, FIG. 8 illustrates the magnet torque, reluctance torque and total torque of the IPM motor in a regenerative braking control region.

As shown in FIG. 7, in the power running control region, where the control advance angle is in the range of 90° to 180°, the magnet torque and the reluctance torque become equal to each other when the control advance angle is equal to 120°. Moreover, the magnet torque is lower than the reluctance torque when the control advance angle is greater than 120° and less than or equal to 180°. In addition, when the control advance angle is in the range of 120° to 180°, a Y connection is more advantageous than a Δ connection.

Figure 8:
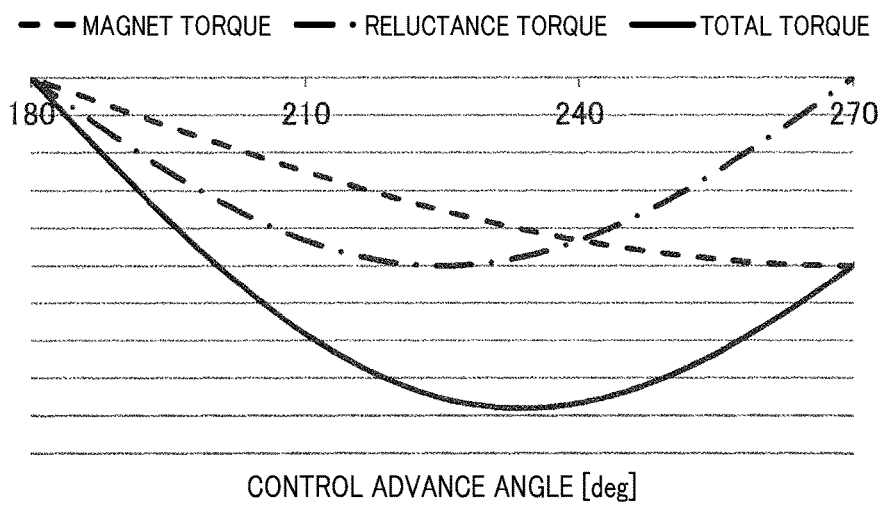
FIG. 8 is a graphical representation illustrating the magnet torque, reluctance torque and total torque of the IPM motor in a regenerative braking control region.

As shown in FIG. 8, in the regenerative braking control region, where the control advance angle is in the range of 180° to 270°, the magnet torque and the reluctance torque become equal to each other when the control advance angle is equal to 240°. Moreover, the magnet torque is lower than the reluctance torque when the control advance angle is greater than or equal to 180° and less than 240°. In addition, when the control advance angle is in the range of 180° to 240°, a Y connection is more advantageous than a Δ connection.

It should be noted that the above ranges of 120° to 180° and 180° to 240° may be varied according to the ratio between the maximum values of the magnet torque and reluctance torque.

Moreover, in the present embodiment, the high-torque region is predetermined so that in the high-torque region, the following Equation (1) is satisfied:

$$T = p\Psi Iq + p(Lq-Ld)Id\, Iq \qquad (1)$$

where T is the total torque produced by the rotor 20, p is the number of magnetic pole pairs of the rotor 20, $\Psi$ is the magnet magnetic flux, Iq is the q-axis electric current, Id is the d-axis electric current, Lq is the q-axis inductance and Ld is the d-axis inductance.

According to the present embodiment, it is possible to achieve the following advantageous effects.

In the present embodiment, the rotating electric machine drive system includes the rotating electric machine 1 and the inverter (or drive apparatus) 40. The rotating electric machine 1 includes the Y-connected three-phase stator coil 35 and the rotor 20 that produces both the magnet torque and the reluctance torque. The inverter 40 drives the rotating electric machine 1. In the predetermined high-torque region, the inverter 40 supplies the stator coil 35 with the electric current which has the waveform obtained by superimposing the specific harmonic waveform on the first-order harmonic waveform. The specific harmonic waveform is one of the third-order and (3+6n)th-order harmonic waveforms or a harmonic waveform which is obtained by synthesizing at least two of the third-order and (3+6n)th-order harmonic waveforms, where n is a natural number greater than or equal to 1. The specific harmonic waveform takes a negative integral value for a positive half cycle of the first-order harmonic waveform and a positive integral value for a negative half cycle of the first-order harmonic waveform.

Figure 9:
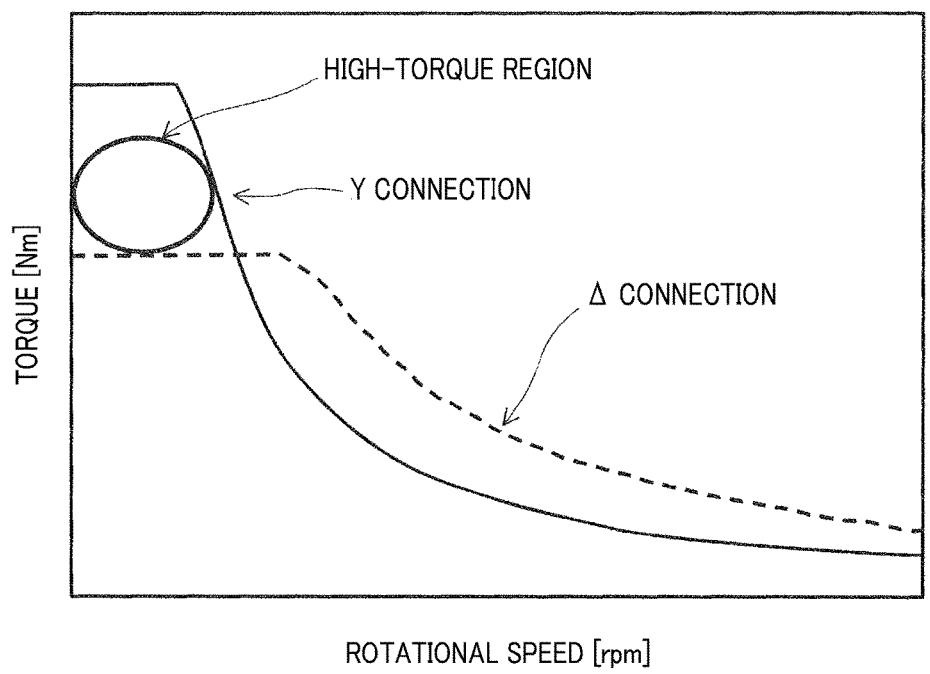
FIG. 9 is a graphical representation illustrating the relationship between the rotational speed and torque of the rotating electric machine according to the first embodiment both when the stator coil is Δ-connected and when the stator coil is Y-connected.

With the above configuration, in the predetermined high-torque region, by supplying the stator coil 35 with the electric current having the waveform obtained by superimposing the specific harmonic waveform on the first-order harmonic waveform, it is possible to increase the q-axis inductance Lq, thereby increasing the reluctance torque. Consequently, it is possible to increase the total torque produced by the rotor 20, thereby achieving a high efficiency of the rotating electric machine 1 in the predetermined high-torque region as shown in FIG. 9.

In the present embodiment, the high-torque region is predetermined as an operating region of the rotating electric machine 1 where the magnet torque produced by the rotor 20 is lower than the reluctance torque produced by the rotor 20.

Predetermining (or setting) the high-torque region as above, it is possible to reliably achieve a high efficiency of the rotating electric machine 1 in the high-torque region.

In the present embodiment, the high-torque region is predetermined so that in the high-torque region, the above Equation (1) is satisfied.

Accordingly, it is possible to easily predetermine (or set) the high-torque region based on the above Equation (1).

[Second Embodiment]

A rotating electric machine drive system according to the second embodiment has a similar configuration to the rotating electric machine drive system according to the first embodiment. Therefore, the differences therebetween will be mainly described hereinafter.

Figure 10:
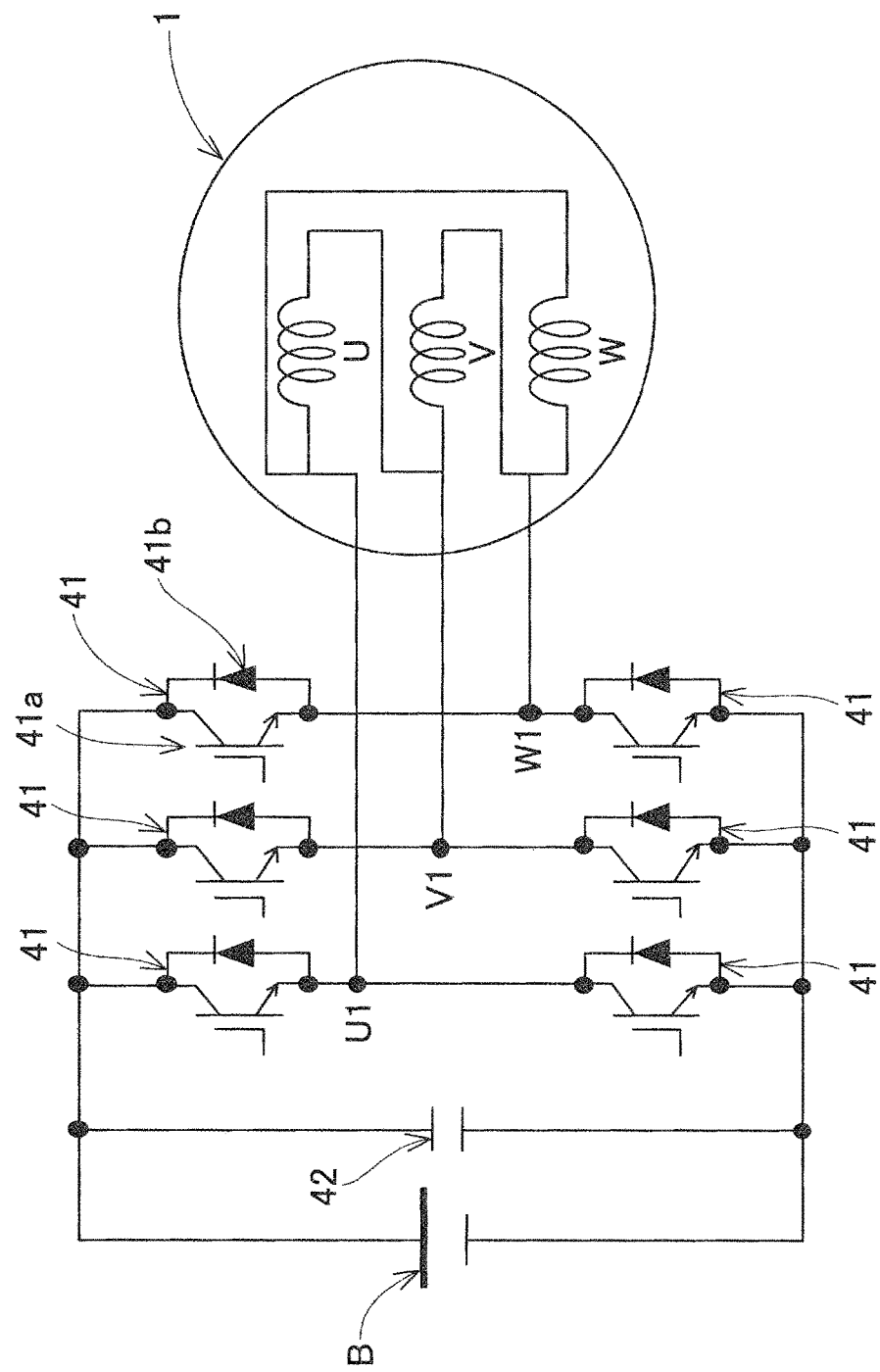
FIG. 10 is a schematic circuit diagram of a rotating electric machine drive system according to a second embodiment.

As shown in FIG. 10, in the present embodiment, the U-phase, V-phase and W-phase windings of the stator coil 35 of the rotating electric machine 1 are Δ-connected, instead of being Y-connected as in the first embodiment. Therefore, it is impossible to expect an increase of efficiency in an operating region of the rotating electric machine 1 where the reluctance torque is higher than the magnet torque.

However, depending on the characteristics of the inverter (or drive apparatus) 40, it is possible to achieve more advantages in comparison with the combination of an ordinary (or general-purpose) inverter and a Δ connection.

In the case of consumer products, more particularly those consumer products which are operated in the vicinities of the users, the PWM frequencies of motor drivers are mostly set above the audible range (or audio-frequency range), i.e., set to be higher than 20 kHz, so as to improve the degree of satisfaction of the users.

On the other hand, in the PWM control of existing inverters used in motor vehicles, the PWM frequencies are mostly set to be not higher than the audible range, more particularly to be in the range of 8 to 12 kHz, so as to secure the system robustness. Moreover, in a high-electric current region, the PWM frequencies are generally set to be not higher than half the respective maximum values, thereby supplying high electric current with less switching losses of the inverters. In these cases, it is easy for sine waves produced by the PWM control to contain the waveforms of third-order and 3(6n−1)th-order harmonics caused by exciting current of the inverters. Furthermore, in the case of performing an overmodulation control for extending the region of use, sine waves are no longer produced, so as to increase the voltage applied to the motor terminals; in this case, the waveform of electric current outputted from the inverters still contains the waveforms of third-order and 3(6n−1)th-order harmonics.

Moreover, in most cases, stator coils of rotating electric machines used in motor vehicles are designed to have a resistance in the order of mΩ, so as to suppress heat produced by the stator coils. Thus, the stator coils have a small number of turns and low impedance. Therefore, in the case of the stator coils being Δ-connected, electric current is generally supplied to the stator coils to cancel circulating current that circulates in the Δ connection; the electric current is inverse in phase and identical in amplitude to the third-order and 3(6n−1)th-order harmonics of the circulating current.

In comparison, in the present embodiment, in the predetermined high-torque region where the magnet torque produced by the rotor 20 is lower than the reluctance torque produced by the rotor 20, the inverter 40 performs either a PWM control with the PWM frequency being not higher than the audible range (more specifically, being in the range of 8 to 20 kHz) or an overmodulation control. Moreover, by configuring the rotating electric machine 1 as to be described in the following third and fourth embodiments, it is possible to utilize the third-order and 3(6n−1)th-order harmonics of the circulating current that circulates in the Δ-connected stator coil 35. Consequently, it is possible to increase (Lq−Ld), thereby increasing the reluctance torque and thus the total torque produced by the rotor 20 in the predetermined high-torque region.

[Third Embodiment]

A rotating electric machine drive system according to the third embodiment has a similar configuration to the rotating electric machine drive system according to the first embodiment. Therefore, the differences therebetween will be mainly described hereinafter.

In the first embodiment, the stator coil 35 of the rotating electric machine 1 is Y-connected. Moreover, the electric current supplied from the inverter (or drive apparatus) 40 to the stator coil 35 is controlled so as to achieve a high efficiency of the rotating electric machine 1.

In comparison, in the present embodiment, the stator coil 35 of the rotating electric machine 1 is configured to be switchable between a Y connection and a Δ connection. A drive apparatus 50 is provided, instead of the inverter 40 described in the first embodiment, to drive the rotating electric machine 1. In the predetermined high-torque region, the drive apparatus 50 supplies electric current to the stator coil 35 with the stator coil 35 switched to the Δ connection. Moreover, instead of controlling the electric current supplied from the drive apparatus 50 to the stator coil 35, an arc ratio θa of each magnetic pole of the rotor 20 is set so as to create the specific harmonic waveform described in the first embodiment, thereby achieving a high efficiency of the rotating electric machine 1.

Figure 11:
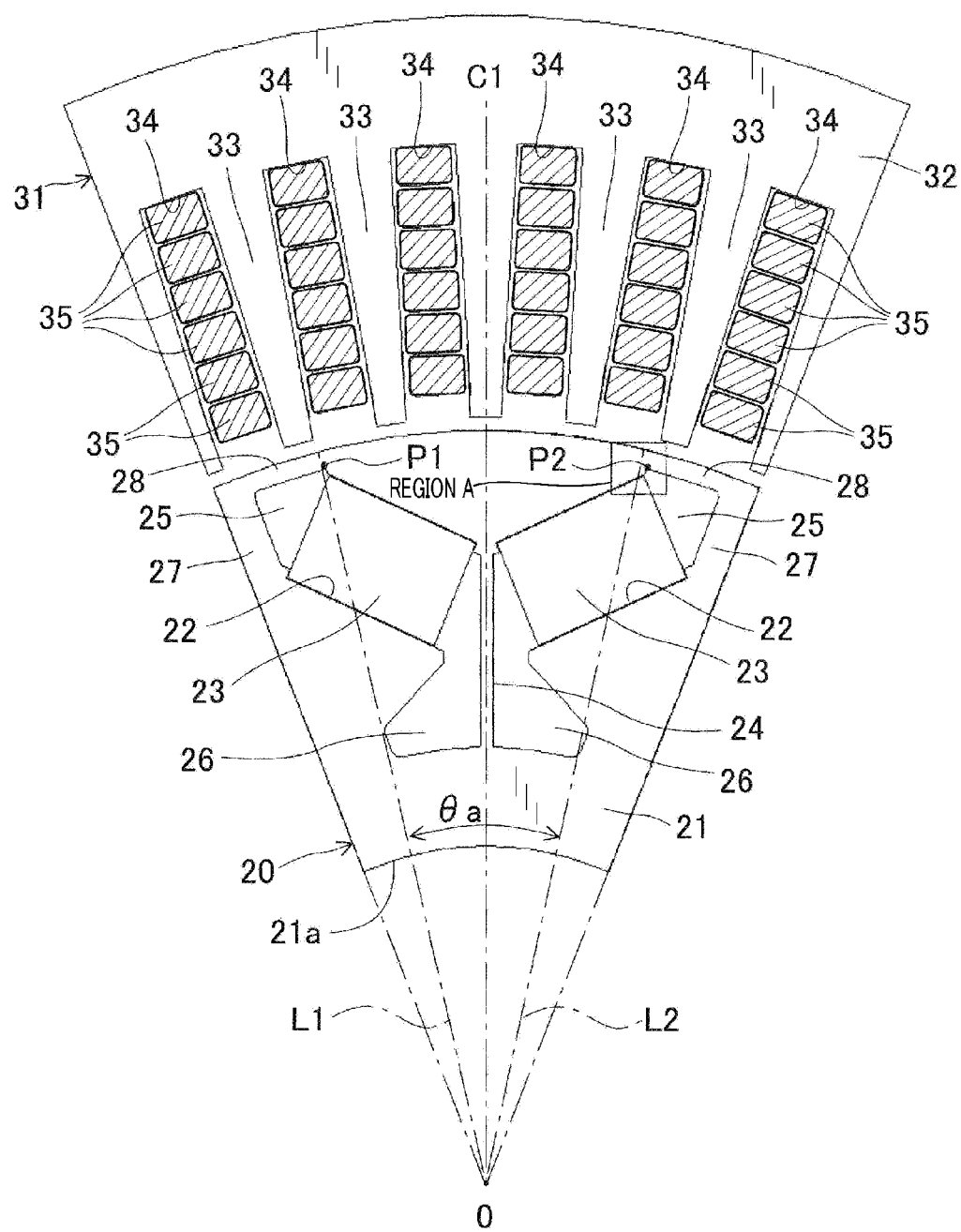
FIG. 11 is a schematic view, along an axial direction, of part of a rotating electric machine included in a rotating electric machine drive system according to a third embodiment.

As shown in FIG. 11, in the present embodiment, none of the teeth 33 of the stator core 31 have protrusions 33a formed at a distal end (or radially inner end) thereof, unlike in the first embodiment. That is, in the present embodiment, each of the teeth 33 radially extends straight without circumferentially protruding at the distal end thereof.

In the present embodiment, the rotor 20 includes eight pairs of permanent magnets 23, as in the first embodiment. The eight pairs of permanent magnets 23 form eight magnetic poles (i.e., 4 N poles and 4 S poles) on the radially outer periphery of the rotor core 21 so that the polarities of the magnetic poles alternate between N and S in the circumferential direction. Moreover, the arc ratio (or angular range) θa of each magnetic pole of the rotor 20 is set to be greater than 120° in electrical angle, so as to create the specific harmonic waveform.

In addition, as described in the first embodiment, the specific harmonic waveform is one of the third-order and (3+6n)th-order harmonic waveforms or a harmonic waveform which is obtained by synthesizing at least two of the third-order and (3+6n)th-order harmonic waveforms, where n is a natural number greater than or equal to 1. The specific harmonic waveform takes a negative integral value for a positive half cycle of the first-order harmonic waveform and a positive integral value for a negative half cycle of the first-order harmonic waveform.

In the present embodiment, for each magnetic pole of the rotor 20, the arc ratio θa represents the angular range within which magnetic flux radially flows from the pair of permanent magnets 23 forming the magnetic pole to the stator 30.

Figure 12:
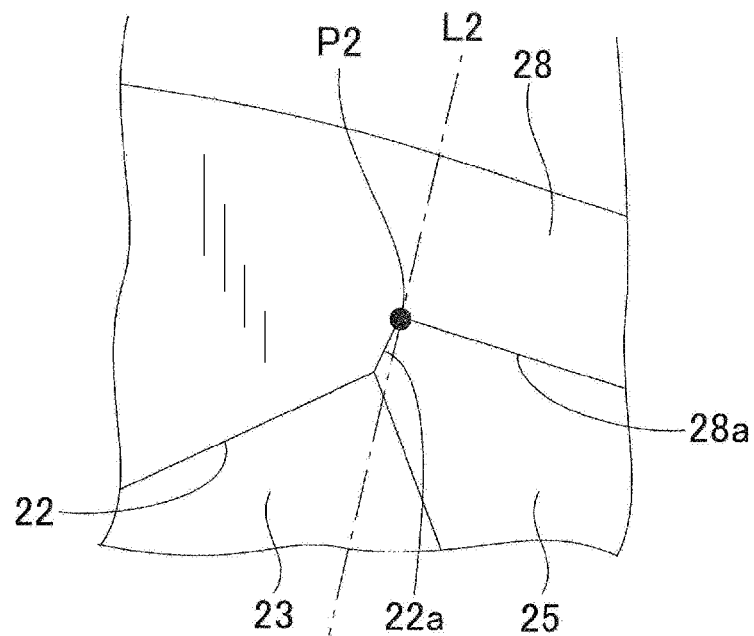
FIG. 12 is an enlarged view of a region A of FIG. 11.

More specifically, in the present embodiment, as shown in FIGS. 11 and 12, the arc ratio θa is defined as an angle between first and second imaginary lines L1 and L2. The first imaginary line L1 extends straight through both the longitudinal axis O of the rotor core 21 (or the axis of rotation of the rotor 20) and an intersection point P1; the intersection point P1 is formed between an extension wall surface 22a, which extends from a radially outer wall surface of the magnet-receiving hole 22 of the rotor core 21 receiving one of the pair of permanent magnets 23 (i.e., the left-side permanent magnet 23 in FIG. 11) toward the first magnetic flux barrier 25 adjacent to the magnet-receiving hole 22, and a radially inner wall surface 28a of a circumferentially-extending bridge 28 of the rotor core 21 which defines the first magnetic flux barrier 25. On the other hand, the second imaginary line L2 extends straight through both the longitudinal axis O of the rotor core 21 and an intersection point P2; the intersection point P2 is formed between an extension wall surface 22a, which extends from a radially outer wall surface of the magnet-receiving hole 22 of the rotor core 21 receiving the other of the pair of permanent magnets 23 (i.e., the right-side permanent magnet 23 in FIG. 11) toward the first magnetic flux barrier 25 adjacent to the magnet-receiving hole 22, and a radially inner wall surface 28a of a circumferentially-extending bridge 28 of the rotor core 21 which defines the first magnetic flux barrier 25.

Next, the reason of setting the arc ratio θa to be greater than 120° in electrical angle will be described with reference to FIGS. 13-22.

Figure 13:
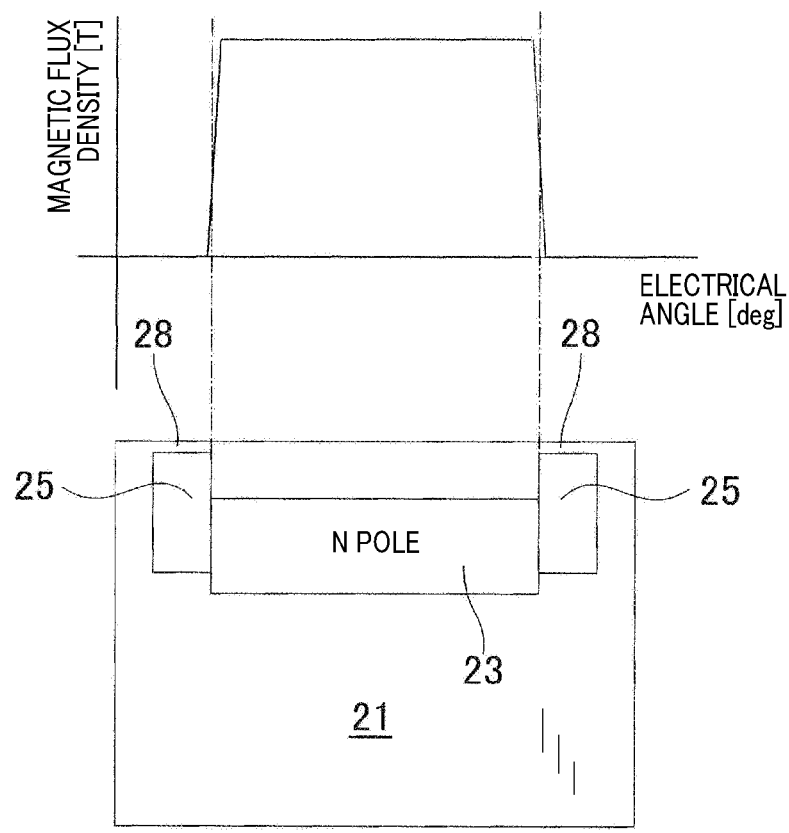
FIG. 13 is a schematic view illustrating the distribution of magnetic flux density on a radially outer surface of part of a rotor of the rotating electric machine according to the third embodiment, the part of the rotor corresponding to one magnetic pole of the rotor.

As shown in FIG. 13, magnetic flux flowing from the permanent magnets 23 to the radially outer surface of the rotor 20 (i.e., the radially outer surface of the rotor core 21) is oriented so as to be evenly emitted to the air gap formed between the rotor 20 and the stator 30.

In addition, in most cases, the waveform of magnetic flux density as shown in FIG. 13 is inclined (or slanted) at the circumferential ends of each magnetic pole of the rotor 20 due to the difference of magnetic reluctance caused by the circumferentially-extending bridges 28 and rounded corners of the pair of permanent magnets 23 forming the magnetic pole; the circumferentially-extending bridges 28 are respectively formed on opposite circumferential sides of the pair of permanent magnets 23 forming the magnetic pole to cause magnetic flux saturation.

Figure 14:
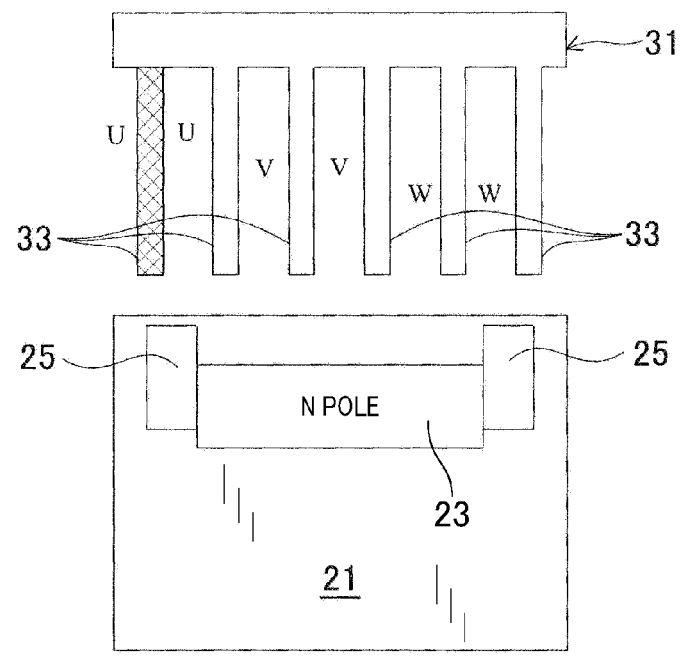
FIG. 14 is a schematic view illustrating the part of the rotor corresponding to one magnetic pole and stator teeth through which magnetic flux effective for a U-phase winding of a stator coil passes.

Referring now to FIG. 14, magnetic flux generated in the rotating electric machine 1 will be explained by taking the U-phase winding of the stator coil 35 as an example. In addition, in the present embodiment, the stator coil 35 is mounted on the stator core 31 in a distributed winding manner with the slot multiplier number set to 2.

The magnetic flux which is effective for the U-phase winding passes through all the teeth 33 of the stator core 31 shown in FIG. 14 except for the shaded tooth (i.e., the leftmost tooth) 33.

Figure 16:
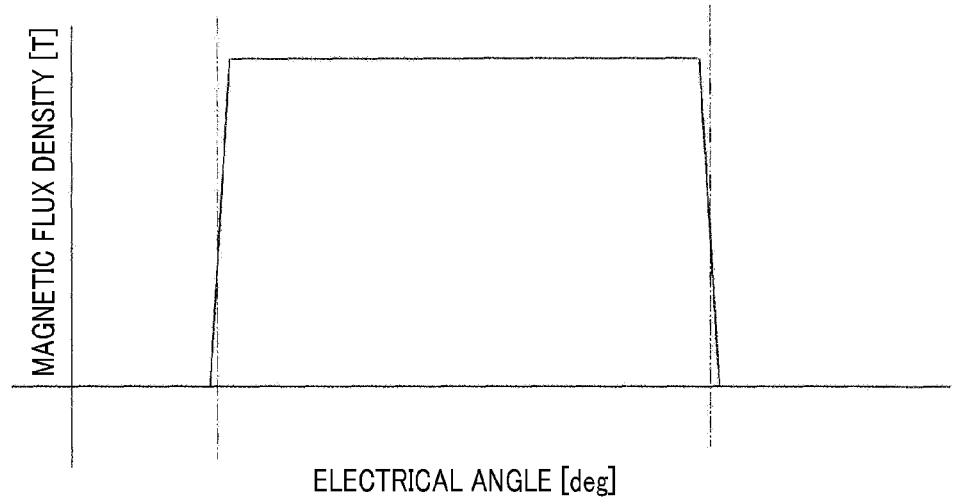
FIG. 16 is a schematic view illustrating the distribution of magnetic flux density on the radially outer surface of the part of the rotor corresponding to one magnetic pole.
Figure 17:
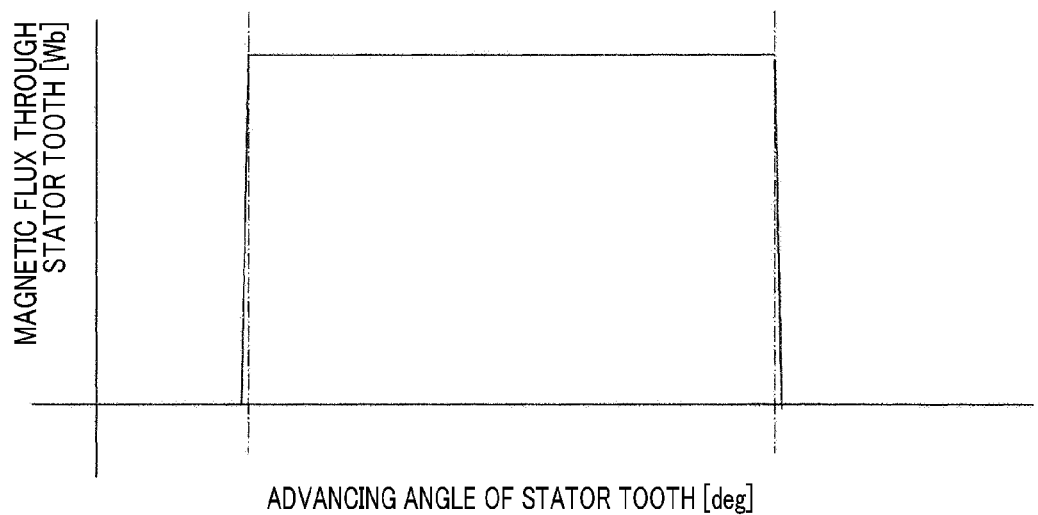
FIG. 17 is a schematic view illustrating the magnetic flux through the stator tooth shown in FIG. 15 when the stator tooth passes by the radially outer surface of the part of the rotor corresponding to one magnetic pole.

Moreover, for explaining the magnetic flux crossing the U-phase winding, the magnetic flux passing through one of the unshaded teeth 33 of the stator core 31 will be first explained with reference to FIGS. 15-17.

Figure 15:
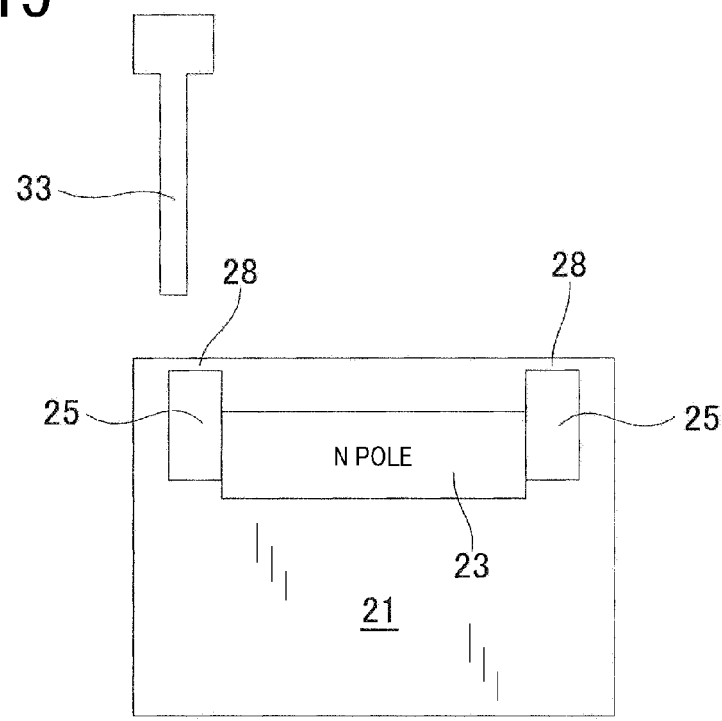
FIG. 15 is a schematic view illustrating the part of the rotor corresponding to one magnetic pole and one of the stator teeth through which the magnetic flux effective for the U-phase winging passes.

During rotation of the rotor 20, the tooth 33 of the stator core 31 shown in FIG. 15 passes by the radially outer surface of that part of the rotor 20 which corresponds to one magnetic pole of the rotor 20. The distribution of magnetic flux density on the radially outer surface of the part of the rotor 20 is as shown in FIG. 16. When the tooth 33 of the stator core 31 passes by the radially outer surface of the part of the rotor 20, the magnetic reluctance between the tooth 33 and the part of the rotor 20 is lowered and thus leakage magnetic flux, which has been leaked to the circumferentially-extending bridges 28 and the air gap between the rotor 20 and the stator 30 due to the difference of magnetic reluctance, comes to flow to the tooth 33. Consequently, the waveform of the magnetic flux through the tooth 33 of the stator core 31 with respect to the advancing angle of the tooth 33 has a basically rectangular shape as shown in FIG. 17.

Figure 18:
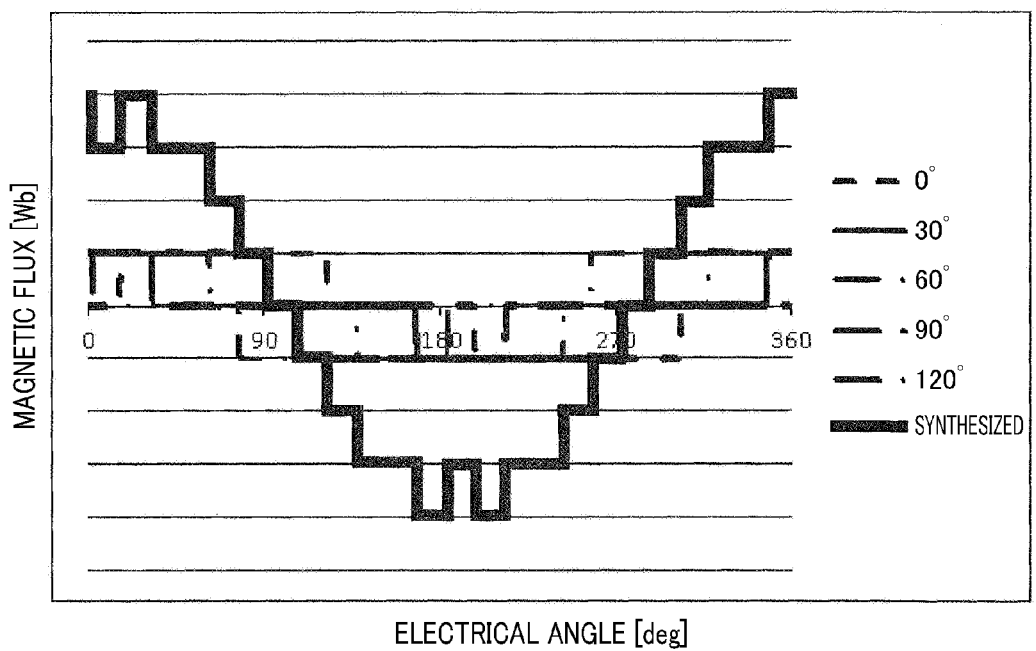
FIG. 18 is a schematic view illustrating the magnetic flux crossing the U-phase winding, which is equal to the sum of the magnetic fluxes respectively through the five unshaded stator teeth in FIG. 14.

Moreover, the magnetic flux crossing the U-phase winding is equal to the sum of the magnetic fluxes respectively through the five unshaded teeth 33 of the stator core 31 in FIG. 14, and thus equal to the sum of magnetic fluxes respectively generated in the five slots 34 of the stator core 31 which are circumferentially offset from one another by 30° in electrical angle. As shown in FIG. 18, the waveform of the magnetic flux crossing the U-phase winding contains the 11th-order and 13th-order harmonic waveforms and thus has rectangularity occurring therein. In addition, it is well-known that the 5+6(n−1)th-order harmonic is generated in a rotating electric machine where the slot multiplier number is equal to n.

Moreover, voltages (or counterelectromotive forces) Eu, Ev and Ew, which are respectively generated by the magnetic fluxes crossing the U-phase, V-phase and W-phase windings of the stator coil 35, have symmetry and thus can be expressed by the following equations:

$Eu = Em_1 \sin(\omega t - 0°) + Em_3 \sin 3\omega t + Em_5 \sin(5\omega t - 0°) + \ldots ;$ $Ev = Em_1 \sin(\omega t - 120°) + Em_3 \sin 3\omega t + Em_5 \sin(5\omega t - 240°) + \ldots ;$ and $Ew = Em_1 \sin(\omega t - 240°) + Em_3 \sin 3\omega t + Em_5 \sin(5\omega t - 120°) + \ldots ,$ where $Em_1$ is the amplitude of the first-order harmonic, $Em_3$ is the amplitude of the third-order harmonic, $Em_5$ is the amplitude of the fifth-order harmonic, ω is the angular velocity and t is time.

In the present embodiment, $Em_3 \sin 3\omega t$ is utilized which is in the same phase for all of Eu, Ev and Ew. Therefore, it is necessary to generate $Em_3 \sin 3\omega t$.

Figure 19:
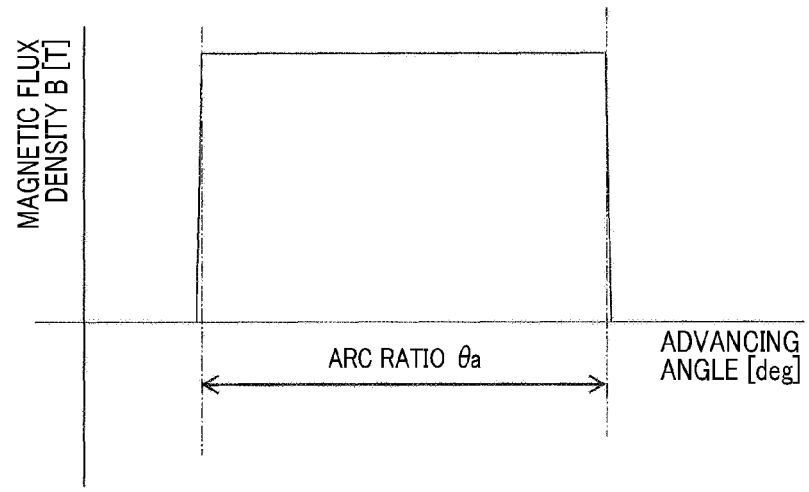
FIG. 19 is a schematic view illustrating the density of magnetic flux which passes through each stator tooth when the stator tooth passes by the radially outer surface of the part of the rotor corresponding to one magnetic pole.

Furthermore, as shown in FIG. 19, the rectangular waveform of the density of magnetic flux through each tooth 33 of the stator core 31 also has symmetry and can be expressed by the following equation:

$Bt = Am_1 \sin \omega t + Am_3 \sin 3\omega t + Am_5 \sin(5\omega t - a) + Am_7 \sin(7\omega t - b) + \ldots ,$ where Bt is the density of magnetic flux which changes with time t, $Am_1$ is the amplitude of the first-order harmonic, $Am_3$ is the amplitude of the third-order harmonic, $Am_5$ is the amplitude of the fifth-order harmonic, $Am_7$ is the amplitude of the seventh-order harmonic, ω is the angular velocity and a and b are phase shifts.

When the arc ratio θa is equal to 120° in electrical angle, the rectangular waveform contains no waveforms of the harmonics of the third-order group. That is, when the arc ratio θa is equal to 120° in electrical angle, it is impossible to utilize the harmonics of the third-order group.

Figure 20:
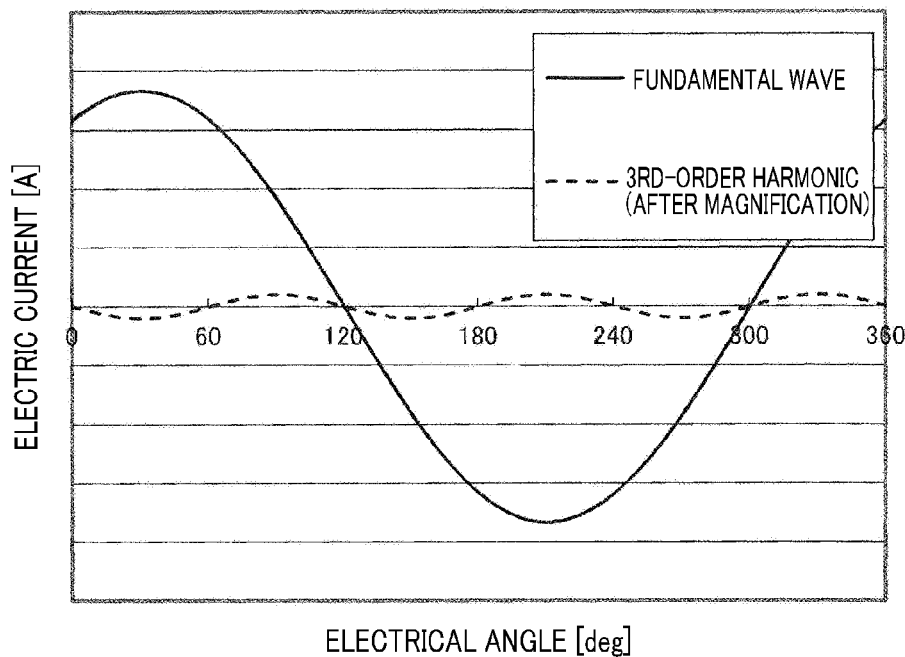
FIG. 20 is a graphical representation illustrating a third-order harmonic when an arc ratio θa of each magnetic pole of the rotor is set to 120° in electrical angle.

FIG. 20 shows the results of a computation using FEM (Finite Element Method) with the arc ratio θa set to 120° in electrical angle. In FIG. 20, the fundamental wave (or the first-order harmonic) of the electric current generated by the magnetic flux crossing the U-phase winding is indicated by a continuous line; the third-order harmonic of the electric current is indicated by a dashed line with the amplitude of the third-order harmonic magnified five times. As seen from FIG. 20, when the arc ratio θa is set to 120° in electrical angle, it is difficult to identify the third-order harmonic even after magnifying the amplitude of the third-order harmonic five times in FIG. 20. Accordingly, it has been made clear that when the arc ratio θa is set to 120° in electrical angle, the third-order harmonic becomes almost zero.

On the other hand, when the arc ratio θa is not equal to 120° in electrical angle, the rectangular waveform shown in FIG. 19 contains the waveforms of the harmonics of the third-order group. To increase the q-axis inductance Lq, it is necessary to shift the phase of $Am_3 \sin 3\omega t$, which is the largest among the components constituting the harmonic electric currents of the third-order group, from the first-order component by +60° in electrical angle. The condition for doing so is that the arc ratio θa is less than 120° in electrical angle. However, after summing the magnetic fluxes respectively through the five unshaded teeth 33 of the stator core 31 in FIG. 14, the positive and negative signs (or polarities) of the third-order harmonic of the electric current are inverted within the range of 0° to 180° in electrical angle with respect to the fundamental wave of the electric current (see FIGS. 21-22). Consequently, the condition for increasing the q-axis inductance Lq becomes that the arc ratio θa is greater than 120° in electrical angle.

Figure 21:
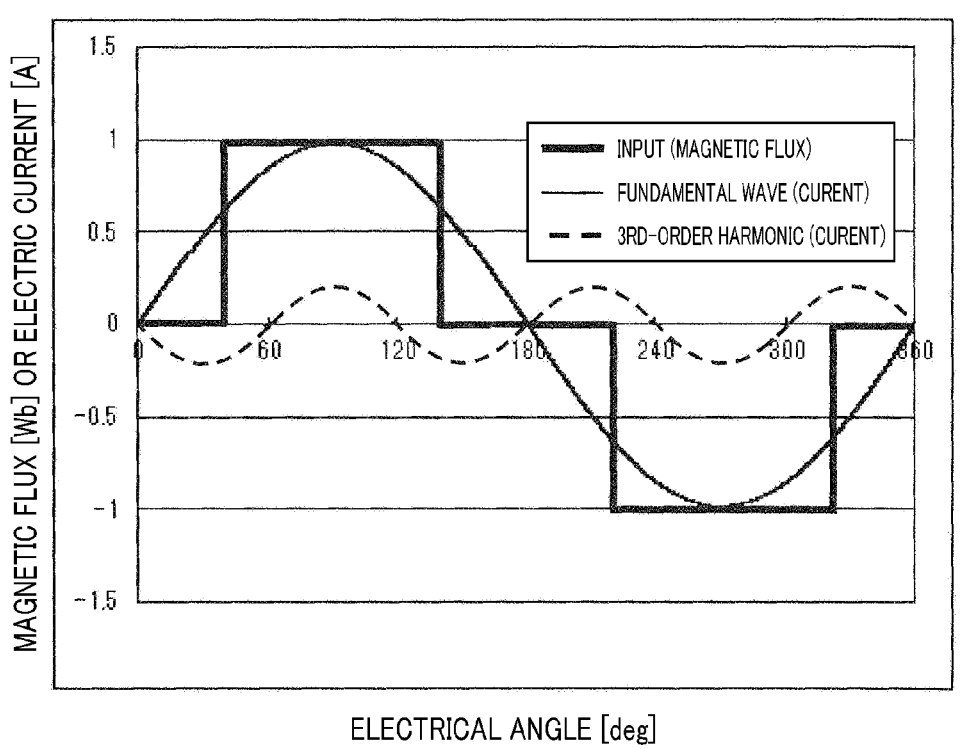
FIG. 21 is a schematic view illustrating the reason of setting the arc ratio θa to be greater than 120° in electrical angle in the third embodiment.
Figure 22:
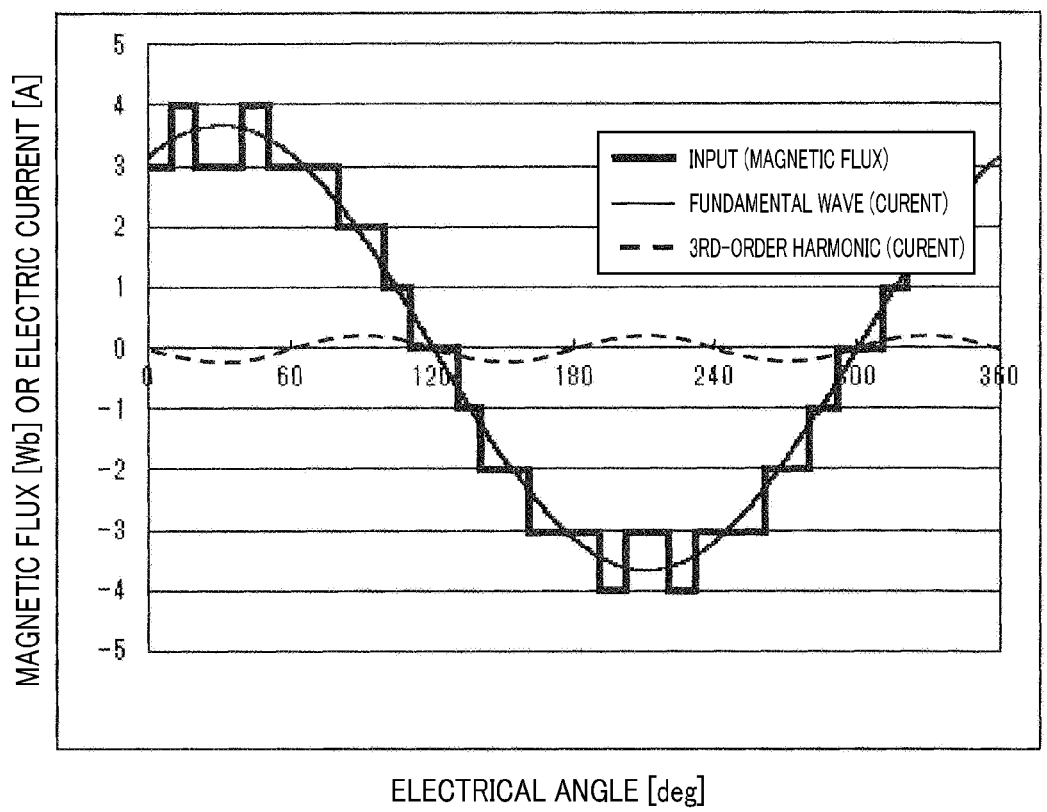
FIG. 22 is another schematic view illustrating the reason of setting the arc ratio θa to be greater than 120° in electrical angle in the third embodiment.

In addition, in FIG. 21, "INPUT" denotes the magnetic flux passing through one of the unshaded teeth 33 of the stator core 31 in FIG. 14; "FUNDAMENTAL WAVE"

denotes the fundamental wave (or the first-order harmonic) of the electric current generated by the magnetic flux passing through the one unshaded tooth 33; and "3RD-ORDER HARMONIC" denotes the third-order harmonic of the electric current generated by the magnetic flux passing through the one unshaded tooth 33. On the other hand, in FIG. 22, "INPUT" denotes the sum of the magnetic fluxes respectively through the five unshaded teeth 33 of the stator core 31 in FIG. 14 (i.e., the magnetic flux crossing the U-phase winding); "FUNDAMENTAL WAVE" denotes the fundamental wave (or the first-order harmonic) of the electric current generated by the sum of the magnetic fluxes; and "3RD-ORDER HARMONIC" denotes the third-order harmonic of the electric current generated by the sum of the magnetic fluxes.

Accordingly, in the present embodiment, the arc ratio θa of each magnetic pole of the rotor 20 is set to be greater than 120° in electrical angle.

Figure 23:
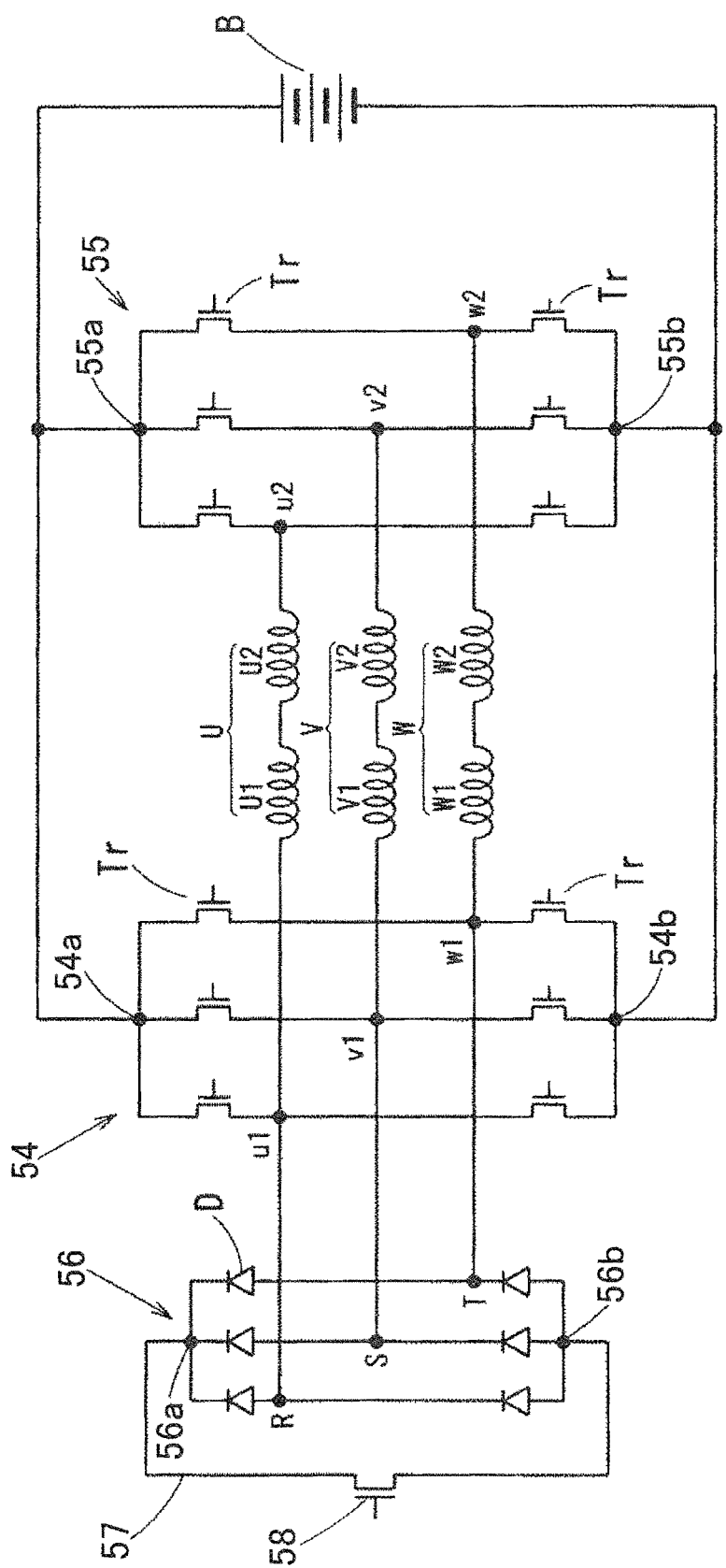
FIG. 23 is a schematic circuit diagram of the rotating electric machine drive system according to the third embodiment.

As shown in FIG. 23, in the present embodiment, the stator coil 35 is configured to be switchable between a Y connection and a Δ connection.

Specifically, in the present embodiment, the drive apparatus 50 includes a first inverter 54, a second inverter 55 and a three-phase full-wave rectifier 56. Each of the U-phase, V-phase and W-phase windings of the stator coil 35 has first and second ends. The first ends of the U-phase, V-phase and W-phase windings are respectively connected to output terminals u1, v1 and w1 of the first inverter 54. The second ends of the U-phase, V-phase and W-phase windings are respectively connected to output terminals u2, v2 and w2 of the second inverter 55. Moreover, the first ends of the U-phase, V-phase and W-phase windings are also respectively connected to input terminals R, S and T of the three-phase full-wave rectifier 56 that is configured with six diodes D.

Each of the first and second inverters 54 and 55 is a three-phase inverter of a well-known type. More specifically, the first inverter 54 has a pair of DC terminals 54a and 54b respectively connected to positive and negative terminals of a vehicle battery (or DC power source) B. Moreover, the first inverter 54 has one pair of switching elements Tr per phase; the pair of switching elements Tr are connected in series with each other between the DC terminals 54a and 54b. The first inverter 54 inverts the DC output voltage of the vehicle battery B into a three-phase AC voltage by controlling on/off operation of the switching elements Tr. Similarly, the second inverter 55 has a pair of DC terminals 55a and 55b respectively connected to the positive and negative terminals of the vehicle battery B. Moreover, the second inverter 55 has one pair of switching elements Tr per phase; the pair of switching elements Tr are connected in series with each other between the DC terminals 55a and 55b. The second inverter 55 inverts the DC output voltage of the vehicle battery B into a three-phase AC voltage by controlling on/off operation of the switching elements Tr.

The three-phase full-wave rectifier 56 has a positive terminal 56a, a negative terminal 56b and a short-circuiting circuit 57 that short-circuits between the positive and negative terminals 56a and 56b. The short-circuiting circuit 57 has an electronic switch 58 connected between the positive and negative terminals 56a and 56b.

In addition, the operations of the first and second inverters 54 and 55 and the on/off operation of the electronic switch 58 are controlled by a not-shown ECU (Electronic Control Unit) based on a signal outputted from a not-shown position sensor that senses the rotational position of the rotor 20 of the rotating electric machine 1.

Next, operation of the rotating electric machine 1 will be described.

In the present embodiment, the rotating electric machine 1 operates in either a Y connection mode or a Δ connection mode.

(a) Y Connection Mode

In driving the rotating electric machine 1 in a low-speed region, the electronic switch 58 is turned on, thereby causing the second inverter 55 to operate while keeping the first inverter 54 in an off state. With the electronic switch 58 being in an on state, the short-circuiting circuit 57 short-circuits between the positive and negative terminals 56a and 56b of the three-phase full-wave rectifier 56. Consequently, the first ends of the U-phase, V-phase and W-phase windings of the stator coil 35 are connected to define a neutral point; the second ends of the U-phase, V-phase and W-phase windings are respectively connected to the output terminals u2, v2 and w2 of the second inverter 55. As a result, the stator coil 35 is Y-connected.

The ECU on/off controls the three pairs of switching elements Tr of the second inverter 55 in a manner of, for example, 180° energization with 120° phase shift therebetween. Consequently, the three-phase AC voltage produced by the second inverter 55 is applied to the Y-connected stator coil 35. As a result, the rotating electric machine 1 functions as an electric motor in which the total number of serially-connected electric conductors is equal to $\sqrt{3}$ M, where M is the number of serially-connected electric conductors per phase.

(b) Δ Connection Mode

In driving the rotating electric machine 1 in a high-speed region, the electronic switch 58 is turned off, causing both the first and second inverters 54 and 55 to operate in sync with each other. With the electronic switch 58 being in an off state, the short-circuiting circuit 57 is opened between the positive and negative terminals 56a and 56b of the three-phase full-wave rectifier 56. Consequently, the first ends of the U-phase, V-phase and W-phase windings of the stator coil 35 are no longer connected to define the neutral point; the circuit configuration of the stator coil 35 becomes equivalent to a Δ connection.

The ECU on/off controls the three pairs of switching elements Tr of the first inverter 54 as well as the three pairs of switching elements Tr of the second inverter 55 in a manner of, for example, 180° energization with 120° phase shift therebetween. Consequently, the three-phase AC voltage produced by the first and second inverters 54 and 55 is applied to the Δ-connected stator coil 35. As a result, the rotating electric machine 1 functions as an electric motor in which the total number of serially-connected electric conductors is equal to M.

Moreover, in the present embodiment, in the predetermined high-torque region where the magnet torque produced by the rotor 20 is lower than the reluctance torque produced by the rotor 20, the drive apparatus 50 drives the rotating electric machine 1 to operate in the Δ connection mode. Consequently, it is possible to increase the q-axis inductance Lq, thereby increasing the reluctance torque. As a result, it is possible to increase the total torque produced by the rotor 20, thereby achieving a high efficiency of the rotating electric machine 1 in the predetermined high-torque region as described in the first embodiment.

According to the present embodiment, it is possible to achieve the following advantageous effects.

In the present embodiment, the rotating electric machine drive system includes the rotating electric machine 1 and the drive apparatus 50. The rotating electric machine 1 includes the stator 30 and the rotor 20. The stator 30 includes the stator core 31 and the three-phase stator coil 35 mounted on the stator core 31. The stator coil 35 is configured to be switchable between the Y connection and the Δ connection. The rotor 20 is configured to produce both the magnet torque and the reluctance torque. The drive apparatus 50 supplies electric current to the stator coil 35 and thereby drives the rotating electric machine 1. In the predetermined high-torque region where the magnet torque produced by the rotor 20 is lower than the reluctance torque produced by the rotor 20, the drive apparatus 50 supplies the electric current to the stator coil 35 with the stator coil 35 switched to the Δ connection.

With the above configuration, in the predetermined high-torque region, it is possible to supply the Δ-connected stator coil 35 with the electric current which has the waveform obtained by superimposing the specific harmonic waveform on the first-order harmonic waveform. Consequently, it is possible to increase the q-axis inductance Lq, thereby increasing the reluctance torque. As a result, it is possible to increase the total torque produced by the rotor 20, thereby achieving a high efficiency of the rotating electric machine 1 in the predetermined high-torque region.

In the present embodiment, the arc ratio θa of each magnetic pole of the rotor 20, which is the angular range within which magnetic flux radially flows from the pair of permanent magnets 23 forming the magnetic pole to the stator 30, is set to be greater than 120° in electrical angle.

Setting the arc ratio θa as above, it is possible to create the specific harmonic waveform of the electric current supplied from the drive apparatus 50 to the stator coil 35. Consequently, it is possible to achieve a high efficiency of the rotating electric machine 1 in the predetermined high-torque region, without controlling the electric current as in the first embodiment.

[First Modification]

In the above-described third embodiment, each of the magnet-receiving holes 22 of the rotor core 21 is formed so that: the radially outer wall surface of the magnet-receiving hole 22 abuts a radially outer side surface of the permanent magnet 23 received in the magnet-receiving hole 22 over the entire length of the radially outer side surface of the permanent magnet 23; and thus the extension wall surface 22a extending from the radially outer wall surface of the magnet-receiving hole 22 does not face the radially outer side surface of the permanent magnet 23 (see FIGS. 11 and 12).

Figure 24:
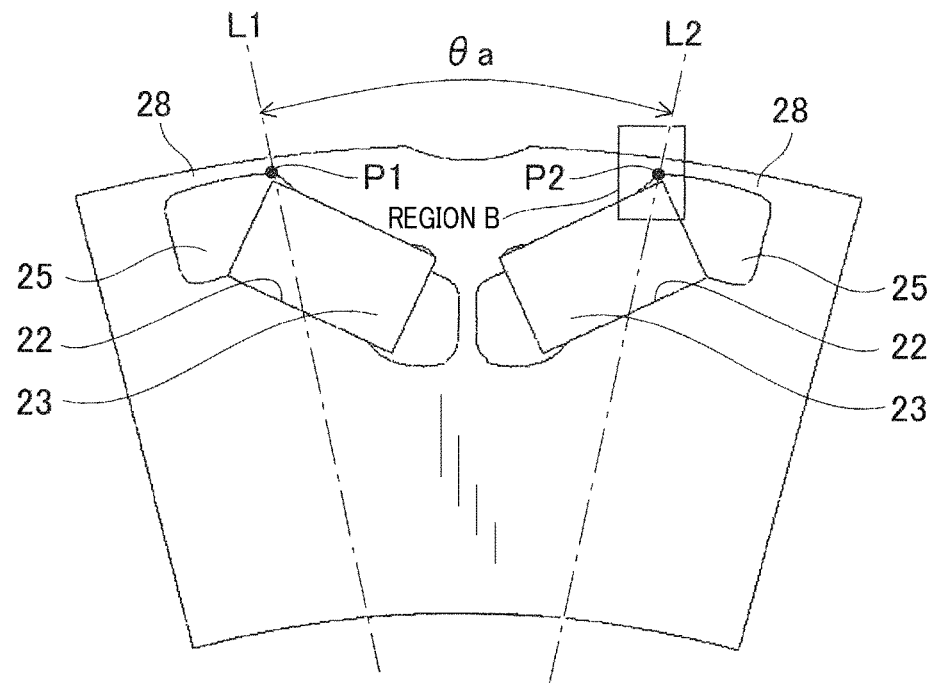
FIG. 24 is a schematic view illustrating the arc ratio θa of each magnetic pole of a rotor according to a first modification of the third embodiment.
Figure 25:
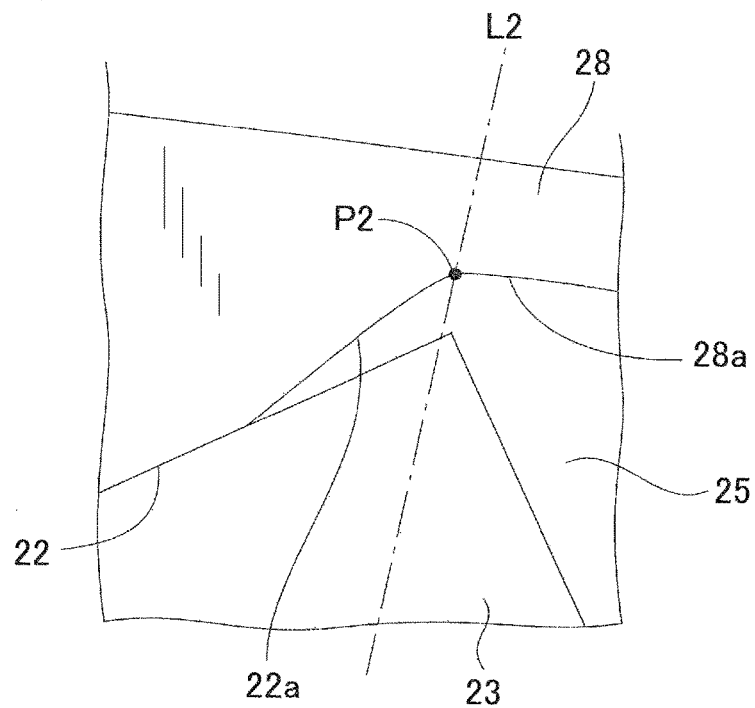
FIG. 25 is an enlarged view of a region B of FIG. 24.

In comparison, in this modification, as shown in FIGS. 24 and 25, each of the magnet-receiving holes 22 of the rotor core 21 is formed so that: the radially outer wall surface of the magnet-receiving hole 22 abuts only part of the radially outer side surface of the permanent magnet 23 received in the magnet-receiving hole 22; and the extension wall surface 22a extending from the radially outer wall surface of the magnet-receiving hole 22 faces the radially outer side surface of the permanent magnet 23 with a radial gap formed therebetween.

However, in this modification, the arc ratio θa of each magnetic pole of the rotor 20 can still be defined as described in the third embodiment.

Specifically, as shown in FIGS. 24 and 25, the arc ratio θa can be defined as an angle between first and second imaginary lines L1 and L2. The first imaginary line L1 extends straight through both the longitudinal axis O of the rotor core 21 and an intersection point P1; the intersection point P1 is formed between the extension wall surface 22a, which extends from the radially outer wall surface of the magnet-receiving hole 22 receiving one of the pair of permanent magnets 23 (i.e., the left-side permanent magnet 23 in FIG. 24) toward the first magnetic flux barrier 25 adjacent to the magnet-receiving hole 22, and the radially inner wall surface 28a of the circumferentially-extending bridge 28 which defines the first magnetic flux barrier 25. On the other hand, the second imaginary line L2 extends straight through both the longitudinal axis O of the rotor core 21 and an intersection point P2; the intersection point P2 is formed between the extension wall surface 22a, which extends from the radially outer wall surface of the magnet-receiving hole 22 receiving the other of the pair of permanent magnets 23 (i.e., the right-side permanent magnet 23 in FIG. 24) toward the first magnetic flux barrier 25 adjacent to the magnet-receiving hole 22, and the radially inner wall surface 28a of the circumferentially-extending bridge 28 which defines the first magnetic flux barrier 25.

[Second Modification]

In the above-described third embodiment, each magnetic pole of the rotor 20 is formed of one pair of permanent magnets 23 arranged in the substantially V-shape that opens toward the radially outer periphery of the rotor core 21. Moreover, the rotor core 21 has a round radially outer surface without protrusions formed thereon (see FIG. 11).

Figure 26:
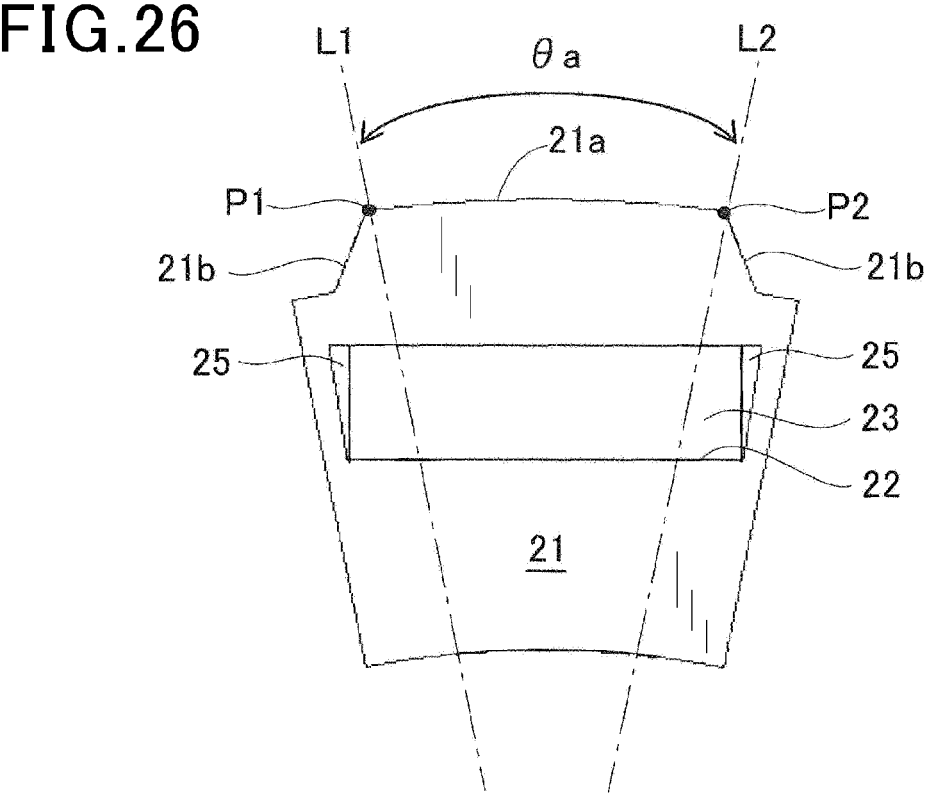
FIG. 26 is a schematic view illustrating the arc ratio θa of each magnetic pole of a rotor according to a second modification of the third embodiment.

In comparison, in this modification, as shown in FIG. 26, each magnetic pole of the rotor 20 is formed of a single permanent magnet 23. Moreover, the rotor core 21 has a plurality of protrusions each of which protrudes radially outward from the radially outer surface of the rotor core 21 and is radially aligned with the permanent magnet 23 forming one of the magnetic poles of the rotor 20. Furthermore, each of the protrusions has a radially outer surface 21a and a pair of oblique surfaces 21b formed respectively on opposite circumferential ends of the radially outer surface 21a as so to extend obliquely with respect to the radially outer surface 21a.

In this modification, the arc ratio θa is defined as an angle between first and second imaginary lines L1 and L2. The first imaginary line L1 extends straight through both the longitudinal axis O of the rotor core 21 and an intersection point P1; the intersection point P1 is formed between the radially outer surface 21a and one of the pair of oblique surfaces 21b (i.e., the left-side oblique surface 21b in FIG. 26) of the protrusion. On the other hand, the second imaginary line L2 extends straight through both the longitudinal axis O of the rotor core 21 and an intersection point P2; the intersection point P2 is formed between the radially outer surface 21a and the other of the pair of oblique surfaces 21b (i.e., the right-side oblique surface 21b in FIG. 26) of the protrusion.

[Third Modification]

Figure 27:
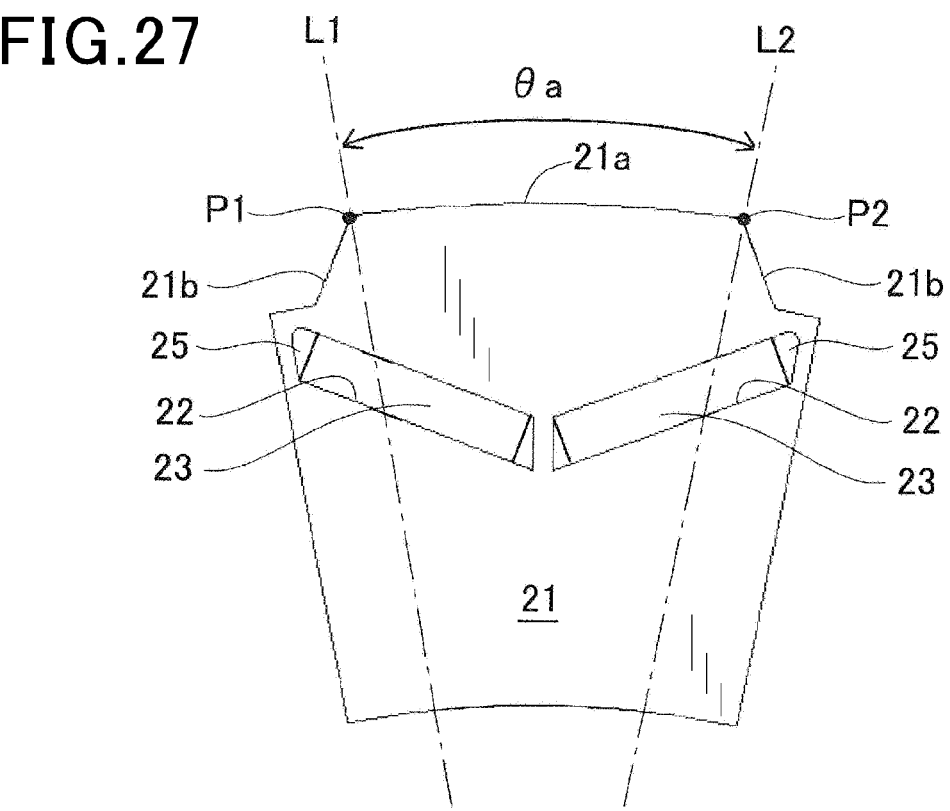
FIG. 27 is a schematic view illustrating the arc ratio θa of each magnetic pole of a rotor according to a third modification of the third embodiment.

As shown in FIG. 27, this modification differs from the above-described second modification only in that each magnetic pole of the rotor 20 is formed of one pair of permanent magnets 23 arranged in a substantially V-shape that opens toward the radially outer periphery of the rotor core 21.

In this modification, the arc ratio θa of each magnetic pole of the rotor 20 can still be defined as described in the second modification.

[Fourth Embodiment]

A rotating electric machine drive system according to the fourth embodiment has a similar configuration to the rotating electric machine drive system according to the third embodiment. Therefore, the differences therebetween will be mainly described hereinafter.

In the third embodiment, each of the teeth 33 of the stator core 31 has no protrusions 33a formed at a distal end thereof (see FIG. 11). Moreover, the arc ratio θa of each magnetic pole of the rotor 20 is set to be greater than 120° in electrical angle (i.e., θa>120°).

Figure 28:
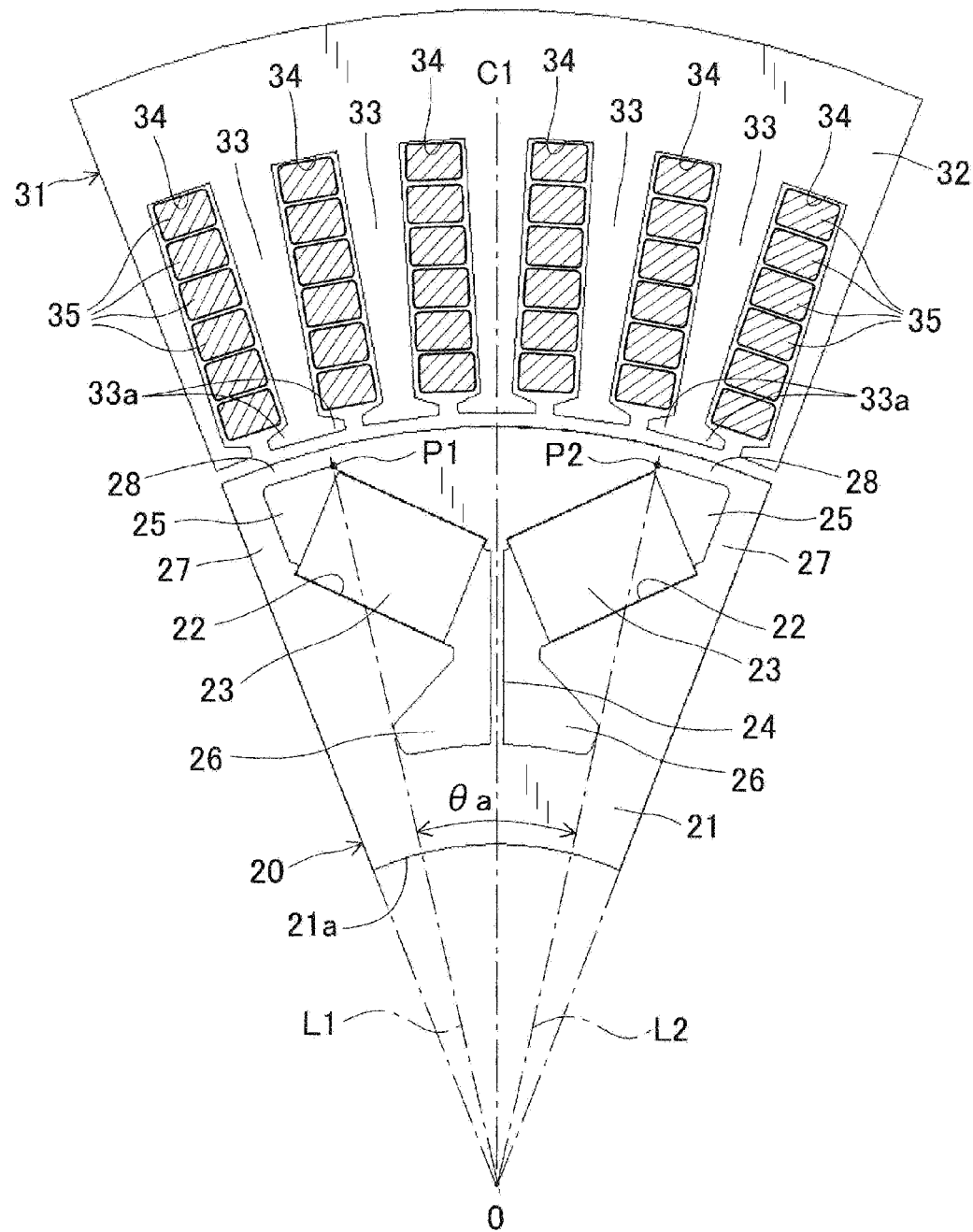
FIG. 28 is a schematic view, along an axial direction, of part of a rotating electric machine included in a rotating electric machine drive system according to a fourth embodiment.
Figure 29:
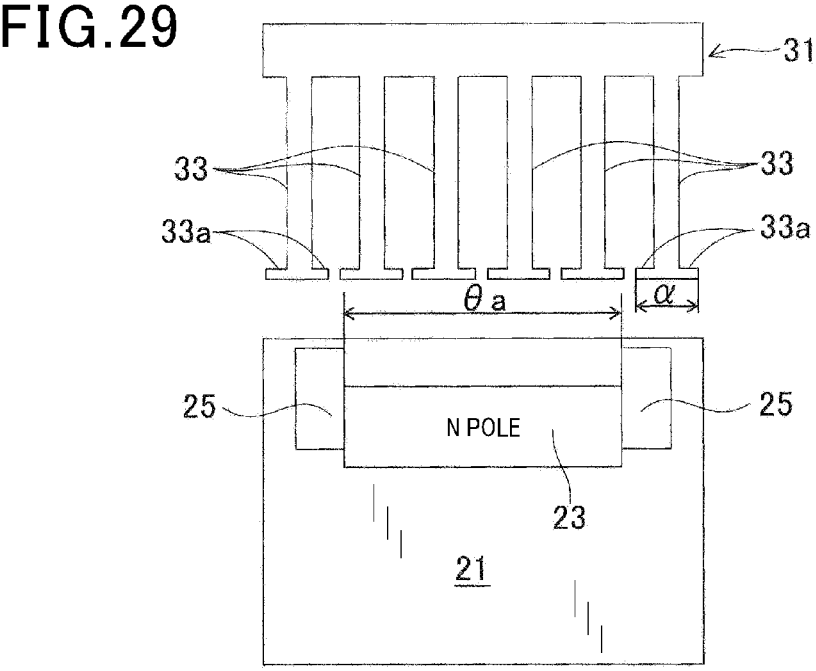
FIG. 29 is a schematic view illustrating one magnetic pole of a rotor and stator teeth receiving magnetic flux from the magnetic pole of the rotor in the rotating electric machine according to the fourth embodiment.

In comparison, in the present embodiment, as shown in FIG. 28, each of the teeth 33 of the stator core 31 has a pair of protrusions 33a formed at a distal end (or radially inner end) thereof so as to protrude respectively toward opposite circumferential sides. Thus, as shown in FIG. 29, for each of the teeth 33 of the stator core 31, a distal end portion of the tooth 33 has a substantially T-shape. That is, with the protrusions 33a, the circumferential width of the distal end portion of the tooth 33 is increased.

Figure 30:
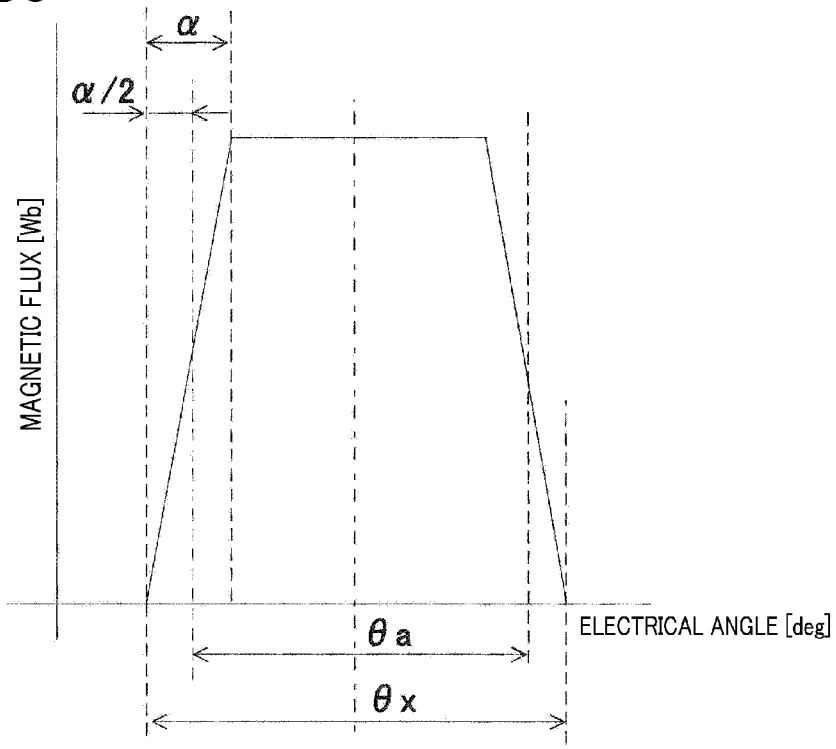
FIG. 30 is a schematic view illustrating an electrical angular range within which the stator teeth receive magnetic flux from the magnetic pole of the rotor.

Moreover, referring to FIG. 30, in the present embodiment, the following relationship is satisfied:

$$\theta x = \theta a + \alpha \geq 120°,$$

where θx is an angular range in electrical angle within which the teeth 33 of the stator core 31 receive magnetic flux from one magnetic pole of the rotor 20 and α is the circumferential width in electrical angle of each of the teeth 33 of the stator core 31 at the distal end thereof.

That is, in the present embodiment, the angular range θx within which the teeth 33 of the stator core 31 receive magnetic flux from one magnetic pole of the rotor 20 is expanded to (θa+α) from θa in the third embodiment. Consequently, it is possible to collect and utilize magnetic flux from each magnetic pole of the rotor 20 in a wider range.

Moreover, as shown in FIG. 30, magnetic flux emitted from one magnetic pole of the rotor 20 and crossing the teeth 33 of the stator core 31 has a substantially trapezoidal waveform. Consequently, with the substantially trapezoidal waveform of the magnetic flux, it is possible to more easily create the desired harmonic electric currents of the third-order group.

In terms of ease of controlling magnetic flux, it is preferable for the teeth 33 with the protrusions 33a to have a short magnetic flux path. It is also preferable to cause the substantially T-shaped distal end portions of the teeth 33 to be magnetically saturated, thereby creating the desired harmonic electric currents of the third-order group. In addition, it is possible to cause the substantially T-shaped distal end portions of the teeth 33 to be magnetically saturated by forming the permanent magnets 23 with a high Br material (e.g., neodymium, samarium or alnico) or replacing at least some of the permanent magnets 23 with electromagnets.

Moreover, to cause the substantially T-shaped distal end portions of the teeth 33 to be magnetically saturated, it is necessary to satisfy the following relationship: Bd×Amag>Bs×Ast, where Bd is the magnetic flux density of the magnets (permanent magnets 23 or electromagnets) in T, Amg is the area of the magnets in mm², Bs is the saturation flux density of the stator 30 in T and Ast is the area of the stator 30 in mm².

In the case where the above relationship is not satisfied, it is preferable to expand the angular range θx to (θa+α) as in the present embodiment. In addition, the above relationship may not be satisfied in the following cases: (1) the stator core 31 is formed of permendur; (2) the magnets are formed of a low Br material such as ferrite; (3) the magnets are electromagnets and exciting current supplied to the electromagnets is low; and (4) though the material of the magnets has a high Br, the amount of the material used for forming the magnets is suppressed in the design of the magnets.

According to the present embodiment, it is possible to achieve the same advantageous effects as described in the third embodiment.

Moreover, in the present embodiment, since the angular range θx is expanded to (θa+α), it is possible to more easily create the desired harmonic electric currents of the third-order group.

[Fifth Embodiment]

A rotating electric machine drive system according to the fifth embodiment has a similar configuration to the rotating electric machine drive system according to the fourth embodiment. Therefore, the differences therebetween will be mainly described hereinafter.

In the fourth embodiment, each magnetic pole of the rotor 20 is formed of one pair of permanent magnets 23 arranged in a substantially V-shape that opens toward the radially outer periphery of the rotor core 21. Moreover, the relationship of θx=θa+α≥120° is satisfied (see FIGS. 28-30).

Figure 31:
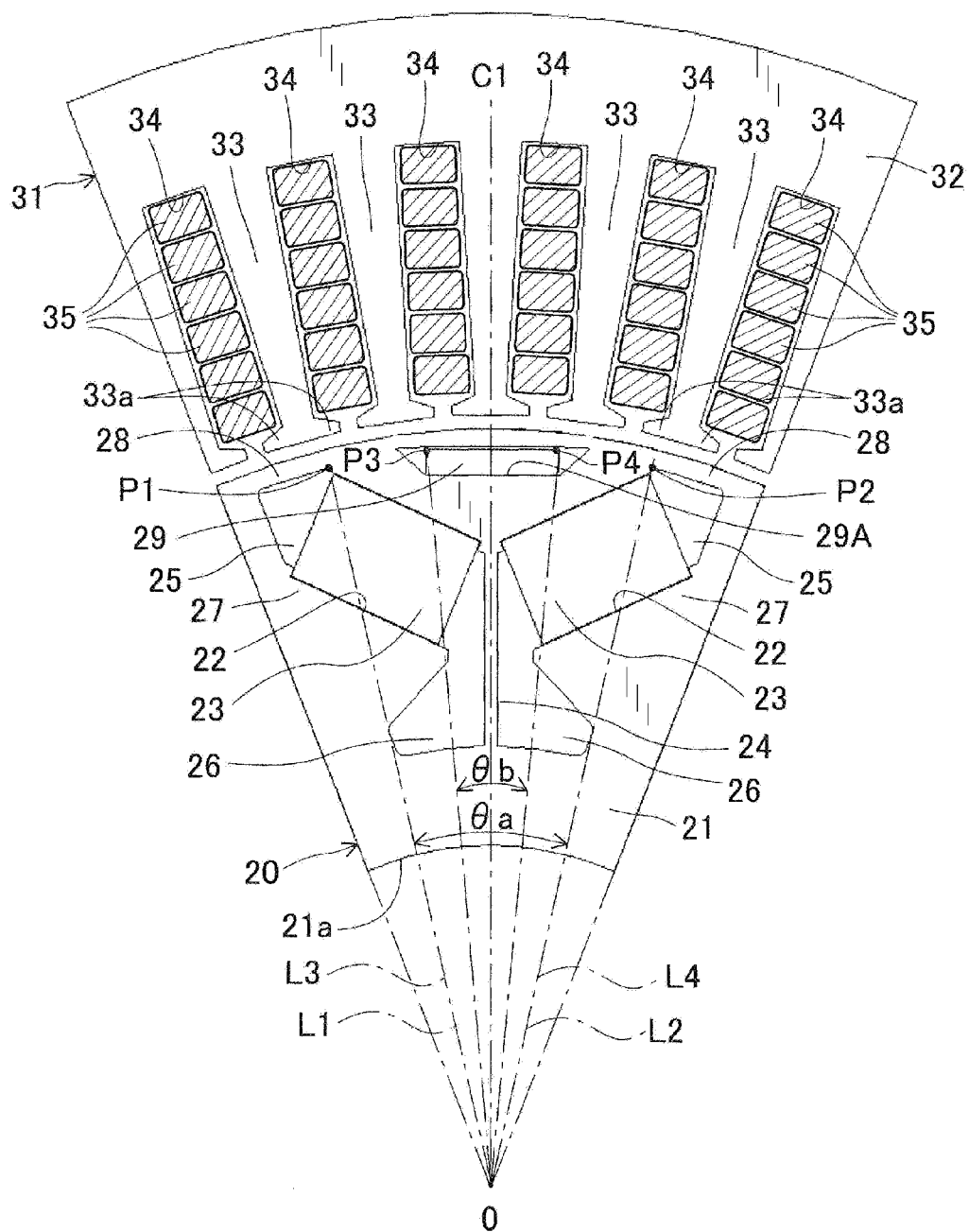
FIG. 31 is a schematic view, along an axial direction, of part of a rotating electric machine included in a rotating electric machine drive system according to a fifth embodiment.

In comparison, in the present embodiment, as shown in FIG. 31, each magnetic pole of the rotor 20 is formed of first and second magnets that are arranged in the rotor core 21 to overlap each other in a radial direction of the rotor core 21.

The first magnet is implemented by a pair of permanent magnets 23 arranged in a substantially V-shape that opens toward the radially outer periphery of the rotor core 21. Moreover, the pair of permanent magnets 23 is symmetrically arranged with respect to the centerline C1 of the magnetic pole. However, the arc ratio θa of the first magnet (i.e., the pair of permanent magnets 23) is set to be less than 120° in electrical angle, unlike in the fourth embodiment. Here, the arc ratio θa represents the angular range within which magnetic flux radially flows from the first magnet to the stator 30.

The second magnet is implemented by a single permanent magnet 29. The second magnet is arranged radially outside (i.e., on the stator 30 side of) the first magnet and symmetrically with respect to the centerline C1 of the magnetic pole. More specifically, the second magnet (i.e., the single permanent magnet 29) is received in a magnet-receiving hole 29A that is formed in the rotor core 21 so as to be located radially outside the pair of magnet-receiving holes 22 receiving the pair of permanent magnets 23 and symmetrical with respect to the centerline C1 of the magnetic pole. Moreover, the arc ratio θb of the second magnet is set to be less than the arc ratio θa of the first magnet. Here, the arc ratio θb represents the angular range within which magnetic flux radially flows from the second magnet to the stator 30.

In the present embodiment, since the first and second magnets are arranged in the rotor core 21 to overlap each other in the radial direction, the phases of the harmonics of the third-order group are inverted within the range where the arc ratio θa of the first magnet (i.e., the pair of permanent magnets 23) and the arc ratio θb of the second magnet (i.e., the single permanent magnet 29) overlap. Consequently, even with the arc ratio θa of the first magnet set to be less than 120° in electrical angle, it is still possible to create the specific harmonic waveform described in the first embodiment, thereby achieving a high efficiency of the rotating electric machine 1.

In addition, it should be noted that the second magnet may also be implemented by a pair of permanent magnets which are arranged in a substantially V-shape that opens toward the radially outer periphery of the rotor core 21.

[Comparative Example]

Figure 32:
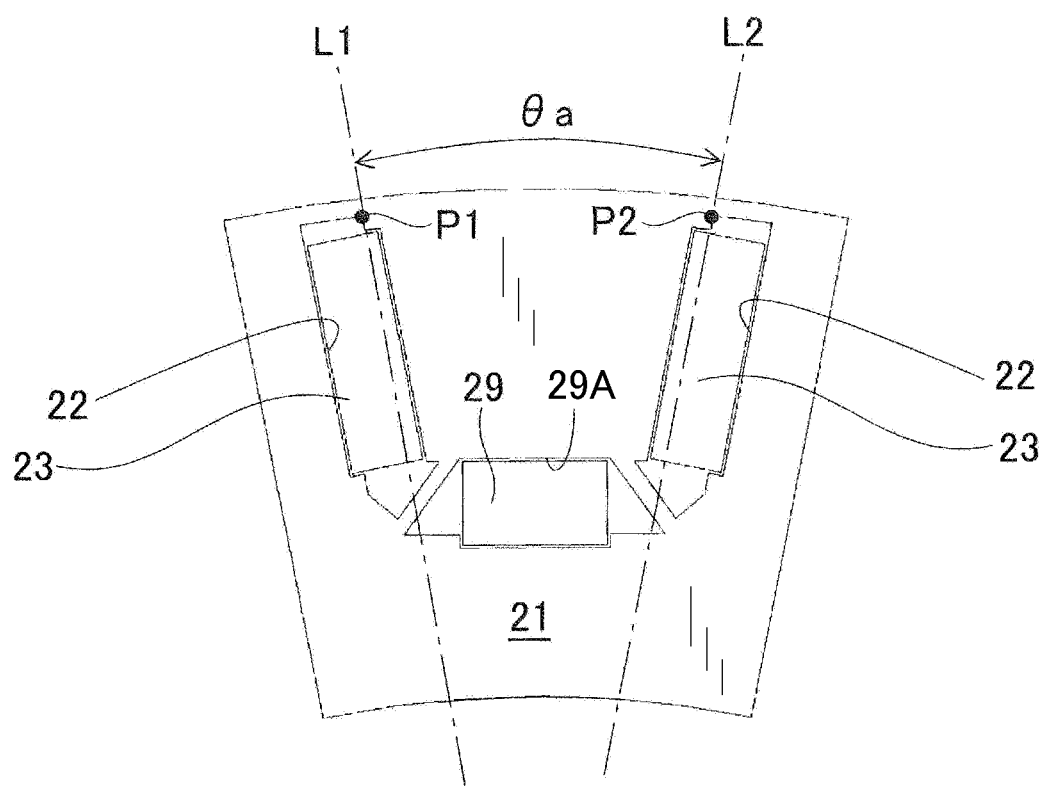
FIG. 32 is a schematic view, along an axial direction, of part of a rotor according to a comparative example.

In this example, as shown in FIG. 32, the second magnet (i.e., the single permanent magnet 29) is arranged radially inside (i.e., on the non-stator 30 side of) the first magnet (i.e., the pair of permanent magnets 23).

With the above arrangement, the phase inversion described in the fifth embodiment does not occur even if the arc ratio θa of the first magnet is set to be less than 120° in electrical angle and the arc ratio θb of the second magnet is set to be less than the arc ratio θa of the first magnet. Consequently, it is impossible to create the specific harmonic waveform.

[Other Embodiments]

While the above particular embodiments have been shown and described, it will be understood by those skilled in the art that the present invention can also be embodied in various other modes without departing from the spirit of the present invention.

For example, in the above-described embodiments, the present invention is directed to a drive system for the rotating electric machine 1 that is configured as an electric motor for use in a motor vehicle. However, the present invention can also be applied to drive systems for other rotating electric machines, such as a drive system for an electric generator or a drive system for a motor-generator that selectively functions either as an electric motor or as an electric generator.

Moreover, in the above-described embodiments, the present invention is directed to a drive system for the rotating electric machine 1 that is of an inner rotor type. However, the present invention can also be applied to a drive system for an outer rotor-type rotating electric machine.

What is claimed is:

1. A rotating electric machine drive system comprising:
a rotating electric machine including a Y-connected three-phase stator coil and a rotor that produces both magnet torque and reluctance torque; and
a drive apparatus that supplies electric current to the stator coil and thereby drives the rotating electric machine, wherein
in a predetermined high-torque region, the drive apparatus supplies the stator coil with the electric current which has a waveform obtained by superimposing a specific harmonic waveform on a first-order harmonic waveform, the specific harmonic waveform being one of third-order and (3+6n)th-order harmonic waveforms, or a harmonic waveform which is obtained by synthesizing at least two of the third-order and (3+6n)th-order harmonic waveforms, where n is a natural number greater than or equal to 1, the specific harmonic waveform taking a negative integral value for a positive half cycle of the first-order harmonic waveform and a positive integral value for a negative half cycle of the first-order harmonic waveform.

2. The rotating electric machine drive system as set forth in claim 1, wherein the predetermined high-torque region is an operating region of the rotating electric machine where the magnet torque produced by the rotor is lower than the reluctance torque produced by the rotor.

3. The rotating electric machine drive system as set forth in claim 1, wherein, in the predetermined high-torque region, the following equation is satisfied:

$$T = p\Psi Iq + p(Lq - Ld)Id\, Iq$$

where T is the total torque produced by the rotor, p is the number of magnetic pole pairs of the rotor, $\Psi$ is magnet magnetic flux, Iq is q-axis electric current, Id is d-axis electric current, Lq is q-axis inductance and Ld is d-axis inductance.

4. A rotating electric machine drive system comprising:
a rotating electric machine including a stator and a rotor, the stator including a stator core and a three-phase stator coil mounted on the stator core, the rotor being configured to produce both magnet torque and reluctance torque; and
a drive apparatus that supplies electric current to the stator coil and thereby drives the rotating electric machine, wherein
the stator coil is Δ-connected, and
in a predetermined high-torque region, which is an operating region of the rotating electric machine where the magnet torque produced by the rotor is lower than the reluctance torque produced by the rotor, the drive apparatus performs one of a PWM control with a PWM frequency being not higher than an audible range and an overmodulation control.

5. The rotating electric machine drive system as set forth in claim 4, wherein, in the predetermined high-torque region, the following equation is satisfied:

$$T = p\Psi Iq + p(Lq - Ld)Id\, Iq$$

where T is the total torque produced by the rotor, p is the number of magnetic pole pairs of the rotor, $\Psi$ is magnet magnetic flux, Iq is q-axis electric current, Id is d-axis electric current, Lq is q-axis inductance and Ld is d-axis inductance.

6. The rotating electric machine drive system as set forth in claim 4, wherein the rotor includes a rotor core disposed in radial opposition to the stator core and a plurality of magnets provided in the rotor core, the magnets forming a plurality of magnetic poles on a stator-side periphery of the rotor core so that polarities of the magnetic poles alternate between N and S in a circumferential direction of the rotor core,
the stator core has a plurality of teeth each radially extending toward the rotor and being spaced from one another at a predetermined pitch in a circumferential direction of the stator core,
each of the teeth of the stator core has a pair of protrusions formed at a distal end thereof so as to protrude respectively toward opposite circumferential sides, and
the following relationship is satisfied: $\theta x = \theta a + \alpha \geq 120°$, where θx is an angular range in electrical angle within which the teeth of the stator core receives magnetic flux from one magnetic pole of the rotor, θa is an arc ratio of each magnetic pole of the rotor, the arc ratio being an angular range in electrical angle within which magnetic flux radially flows from the magnetic pole to the stator, and α is a circumferential width in electrical angle of each of the teeth of the stator core at the distal end thereof.

7. The rotating electric machine drive system as set forth in claim 4, wherein the rotor includes a rotor core disposed in radial opposition to the stator core and a plurality of magnetic poles formed on a stator-side periphery of the rotor core so that polarities of the magnetic poles alternate between N and S in a circumferential direction of the rotor core,
each of the magnetic poles of the rotor is formed of first and second magnets that are arranged in the rotor core to overlap each other in a radial direction of the rotor core,
an arc ratio θa of the first magnet, which is an angular range within which magnetic flux radially flows from the first magnet to the stator, is set to be less than 120° in electrical angle, and
the second magnet is arranged on the stator side of the first magnet, and an arc ratio θb of the second magnet, which is an angular range within which magnetic flux radially flows from the second magnet to the stator, is set to be less than the arc ratio θa of the first magnet.

8. The rotating electric machine drive system as set forth in claim 4, wherein the rotor includes a rotor core disposed in radial opposition to the stator core and a plurality of magnets provided in the rotor core, the magnets forming a plurality of magnetic poles on a stator-side periphery of the rotor core so that polarities of the magnetic poles alternate between N and S in a circumferential direction of the rotor core, and an arc ratio θa of each magnetic pole of the rotor, which is an angular range within which magnetic flux radially flows from the magnetic pole to the stator, is set to be greater than 120° in electrical angle, so as to create a specific harmonic waveform of the electric current supplied from the drive apparatus to the stator coil, the specific harmonic waveform being one of third-order and (3+6n)th-order harmonic waveforms, or a harmonic waveform which is obtained by synthesizing at least two of the third-order and (3+6n)th-order harmonic waveforms, where n is a natural number greater than or equal to 1, the specific harmonic waveform taking a negative integral value for a positive half cycle of a first-order harmonic waveform of the electric current and a positive integral value for a negative half cycle of the first-order harmonic waveform.

9. A rotating electric machine drive system comprising:

a rotating electric machine including a stator and a rotor, the stator including a stator core and a three-phase stator coil mounted on the stator core, the rotor being configured to produce both magnet torque and reluctance torque; and a drive apparatus that supplies electric current to the stator coil and thereby drives the rotating electric machine, wherein the stator coil is configured to be switchable between a Y connection and a Δ connection, and in a predetermined high-torque region, which is an operating region of the rotating electric machine where the magnet torque produced by the rotor is lower than the reluctance torque produced by the rotor, the drive apparatus supplies the electric current to the stator coil with the stator coil switched to the Δ connection.

10. The rotating electric machine drive system as set forth in claim 9, wherein, in the predetermined high-torque region, the following equation is satisfied:

$$T=p\Psi Iq+p(Lq-Ld)Id\ Iq$$

where T is the total torque produced by the rotor, p is the number of magnetic pole pairs of the rotor, Ψ is magnet magnetic flux, Iq is q-axis electric current, Id is d-axis electric current, Lq is q-axis inductance and Ld is d-axis inductance.

11. The rotating electric machine drive system as set forth in claim 9, wherein the rotor includes a rotor core disposed in radial opposition to the stator core and a plurality of magnets provided in the rotor core, the magnets forming a plurality of magnetic poles on a stator-side periphery of the rotor core so that polarities of the magnetic poles alternate between N and S in a circumferential direction of the rotor core, and an arc ratio θa of each magnetic pole of the rotor, which is an angular range within which magnetic flux radially flows from the magnetic pole to the stator, is set to be greater than 120° in electrical angle, so as to create a specific harmonic waveform of the electric current supplied from the drive apparatus to the stator coil, the specific harmonic waveform being one of third-order and (3+6n)th-order harmonic waveforms, or a harmonic waveform which is obtained by synthesizing at least two of the third-order and (3+6n)th-order harmonic waveforms, where n is a natural number greater than or equal to 1, the specific harmonic waveform taking a negative integral value for a positive half cycle of a first-order harmonic waveform of the electric current and a positive integral value for a negative half cycle of the first-order harmonic waveform.

12. The rotating electric machine drive system as set forth in claim 9, wherein the rotor includes a rotor core disposed in radial opposition to the stator core and a plurality of magnets provided in the rotor core, the magnets forming a plurality of magnetic poles on a stator-side periphery of the rotor core so that polarities of the magnetic poles alternate between N and S in a circumferential direction of the rotor core, the stator core has a plurality of teeth each radially extending toward the rotor and being spaced from one another at a predetermined pitch in a circumferential direction of the stator core, each of the teeth of the stator core has a pair of protrusions formed at a distal end thereof so as to protrude respectively toward opposite circumferential sides, and the following relationship is satisfied: $\theta x=\theta a+\alpha \geq 120°$, where θx is an angular range in electrical angle within which the teeth of the stator core receives magnetic flux from one magnetic pole of the rotor, θa is an arc ratio of each magnetic pole of the rotor, the arc ratio being an angular range in electrical angle within which magnetic flux radially flows from the magnetic pole to the stator, and α is a circumferential width in electrical angle of each of the teeth of the stator core at the distal end thereof.

13. The rotating electric machine drive system as set forth in claim 9, wherein the rotor includes a rotor core disposed in radial opposition to the stator core and a plurality of magnetic poles formed on a stator-side periphery of the rotor core so that polarities of the magnetic poles alternate between N and S in a circumferential direction of the rotor core, each of the magnetic poles of the rotor is formed of first and second magnets that are arranged in the rotor core to overlap each other in a radial direction of the rotor core, an arc ratio θa of the first magnet, which is an angular range within which magnetic flux radially flows from the first magnet to the stator, is set to be less than 120° in electrical angle, and the second magnet is arranged on the stator side of the first magnet, and an arc ratio θb of the second magnet, which is an angular range within which magnetic flux radially flows from the second magnet to the stator, is set to be less than the arc ratio θa of the first magnet.

\* \* \* \* \*